(12) United States Patent
Park et al.

(10) Patent No.: US 6,936,200 B2
(45) Date of Patent: Aug. 30, 2005

(54) PLASTIC WOOD FIBER FOAM STRUCTURE AND METHOD OF PRODUCING SAME

(75) Inventors: Chul B. Park, Etobicoke (CA); Ghaus M. Rizvi, 123-1755 Rathburn Road East, Mississauga, Ontario (CA), L4W 2M8; Haiou Zhang, 65 Baldoon Road, #8, Chatham, Ontario (CA), N7L 1E2

(73) Assignees: Chul Park, Etobicoke (CA); Ghaus M. Rizvi, Mississauga (CA); Haiou Zhang, Chatham (CA)

( * ) Notice: Subject to any disclaimer, the term of this patent is extended or adjusted under 35 U.S.C. 154(b) by 86 days.

(21) Appl. No.: 10/005,365

(22) Filed: Dec. 7, 2001

(65) Prior Publication Data

US 2002/0165289 A1 Nov. 7, 2002

Related U.S. Application Data

(60) Provisional application No. 60/288,445, filed on May 4, 2001.

(51) Int. Cl.[7] .............................................. B29C 44/22
(52) U.S. Cl. ........................ 264/45.3; 264/45.9; 264/50; 264/54
(58) Field of Search ........................... 264/54, 45.9, 50, 264/45.3

(56) References Cited

U.S. PATENT DOCUMENTS

| | | | | |
|---|---|---|---|---|
| 5,082,605 A | * | 1/1992 | Brooks et al. | 264/40.6 |
| 5,474,722 A | * | 12/1995 | Woodhams | 264/45.3 |
| 5,486,553 A | * | 1/1996 | Deaner et al. | 524/13 |
| 5,847,016 A | * | 12/1998 | Cope | 521/84.1 |
| 5,866,641 A | * | 2/1999 | Ronden et al. | 523/219 |
| 5,951,927 A | * | 9/1999 | Cope | 264/54 |
| 6,054,207 A | * | 4/2000 | Finley | 428/317.9 |
| 6,066,680 A | * | 5/2000 | Cope | 521/79 |
| 6,153,293 A | * | 11/2000 | Dahl et al. | 428/310.5 |
| 6,280,667 B1 | * | 8/2001 | Koenig et al. | 264/68 |
| 6,295,777 B1 | * | 10/2001 | Hunter et al. | 52/519 |
| 6,342,172 B1 | * | 1/2002 | Finley | 264/45.3 |
| 6,344,268 B1 | * | 2/2002 | Stucky et al. | 428/317.9 |

FOREIGN PATENT DOCUMENTS

WO  WO 02/088233  11/2002

\* cited by examiner

*Primary Examiner*—Allan R. Kuhns
(74) *Attorney, Agent, or Firm*—Nancy E. Hill; Hill & Schumacher

(57) ABSTRACT

A process for producing plastic/wood fiber composite foamed structures includes the steps of pre-drying wood fiber filler; mixing it with plastic to form a mixture; feeding the mixture into an extruder; introducing and mixing a blowing agent; subject the mixture to high shear forces and extruding the mixture to produce a plastic/wood fiber composite foamed structure. The filler has a degradation temperature and an active volatization temperature. During the pre-drying step the temperature is maintained below the degradation temperature. During the mixing step the mixing temperature is maintained below the active volatilizing temperature. During the introducing and mixing step a blowing agent is introduced into the plastic/wood fiber mixture and is mixed therewith to produce a plastic/wood fiber/gas mixture. During the subjecting step the plastic/wood fiber/gas mixture is subjected to high shear forces in the presence of high pressures and the temperature is maintained below an active volatilizing temperature.

35 Claims, 21 Drawing Sheets

PLASTIC WOOD FIBER FOAM STRUCTURE AND METHOD OF PRODUCING SAME

CROSS REFERENCE TO RELATED PATENT APPLICATION

This patent application relates to U.S. Provisional Patent Application Ser. No. 60/288,445 filed on May 4, 2001 entitled PLASTIC WOOD FIBER FOAM STRUCTURE AND METHOD OF PRODUCING SAME which is incorporated herein by reference.

FIELD OF INVENTION

This invention relates to the continuous production of plastic/wood fiber composite foams, in an extrusion process, and is more particularly directed to increasing the number of cells and reduction of cell size and thereby, improving the distribution of cells in the plastic matrix.

BACKGROUND OF THE INVENTION

The end of twentieth century is characterized by a large increase of thermoplastic consumption with the consequent increase in their prices [1,2]. This situation has created an impetus for cost reduction by utilizing fillers in thermoplastic to form composite materials [3]. Composite materials also offer the opportunity to utilize the favorable properties of the constituent components [1–31].

The cost of wood-fibers is substantially lower than the other commonly used fibrous filler materials such as glass, mica and the like. Plastic/wood-fiber composites exhibit improved stiffness in addition to their lower costs. They can be a cost effective alternative to many filled plastics or metals in terms of bending stiffness or weight [3]. The wood-fibers are non-abrasive so that relatively large concentrations can be incorporated into plastics without causing serious machine wear during blending and processing.

Although plastic/wood-fiber composites have been commercialized, and can compete with certain plastic and wood products, their potential industrial applications have been limited because of their low impact strength and high density compared to natural wood and certain plastics [4].

Impact strength and ductility of plastics can be significantly improved by incorporating a fine cell structure into them [5]. Additional benefits of having a foamed structure are the reduction in weight and cost. Therefore, it is reasonable to expect that, if a fine-celled structure is successfully produced in plastic/wood-fiber composites, the problems with impact strength and weight mentioned earlier can be reduced or eliminated. This would significantly increase the potential applications of these composites.

Water vapor adsorbed in the wood fiber is released during heating (plasticizing) stage of extrusion, and is retained in the melt in a gaseous or liquid state until the extrudate comes out of the die. This results in the foam structure being very non-uniform. To get a good foam structure, it is preferable to maximize the extraction (purging out) of the moisture from the wood fiber before the final processing of the composite foam in the extruder. However, even oven-dried wood-fiber releases additional moisture or other volatile gases when it is further heated to the processing temperature of the plastics, which is typically above 180° C. This has been shown in a thermo gravimetric analysis (TGA) study [22]. The fibers were initially heated at 110° C. for about 150 minutes so that they were completely dry. At this point, the temperature was raised to 205° C., and it was observed that the wood-fibers lost an additional 3% weight. Therefore it is not sufficient to define the moisture content in terms of the conventional moisture content formula used for lumber wood. This additional moisture, or volatile gases should be taken into account for foaming applications.

A thorough review of the extrusion process is provided by Rauwendaal [6]. The processing of wood-fiber composites is a well-known art, and is described in many patents.

There are a number of patents [7–9] directed to producing wood fiber/plastic composite pellets in which the fibers are "encapsulated" by the plastic. The encapsulation is achieved by processing the mixture at a temperature above the melting point of the plastic. The lowest temperature at which thorough "wetting" occurs is designated as the "encapsulation point". These pellets are then processed in extruder to make the finished product profile. However, the major draw back with it is that it is batch processing and would involve additional costs associated with such processes.

Turk et al [10], describes a process for preparing a natural fiber and thermoplastic composite, in which they used a vented extruder to remove the gaseous products and moisture released by the fibers. They describe a number of modifications carried out to prevent the loss of the extrudate from the vent. Even after all the modifications, an "interfacial agent" was required for overcoming this problem. This suggests that different materials with different compositions may require different "Interfacial agent". Therefore, for many compositions suitable "interfacial agent" may not exist.

Deaner et al [11–14] first produced pellets of plastic wood-fiber composites, which were subsequently used for profile extrusion. They describe the importance of reducing the moisture content from the wood-fiber at the pelletizing stage. The moisture in wood fiber is reduced to less than 8 wt-% at this stage. At the final extrusion stage, the moisture is again removed using a vent under 3 inches of vacuum. The final product produced using this process is, however, heavier than the wood it replaces.

Pelikan et al [15] describe a process of producing cellular cavities in which the bubble-forming agent is bound to a carrier, such as vegetable or wood fibers, by molecular or capillary action. In this case the blowing agent is water, it is released at a temperature higher than 120 C., and is thus released more gradually leading to a uniform distribution of closed cells within the plastic matrix.

Boutillier [16] and Cope [17, 18] describe production of plastic/wood-fiber composite foamed profiles using the so-called Celuka process. The outer surface of the extrudate is cooled, below the softening temperature of extrudate, upon exiting from the die. The solidified skin prevents the expansion in the outward direction and the material expands inwards, into a hollow cavity created by a solid body inside the die. However, it is difficult to control the expansion process and the foam structure obtained is non-uniform.

Accordingly, there is clearly a need for foamed thermoplastic/wood-fiber composites, which exhibit fine-celled structure and have easy processability. As mentioned earlier, the removal of moisture from the wood-fiber is necessary to obtain controlled expansion and uniform distribution of the cell structure throughout the product. Further, it should be removed at the highest processing temperature or as close to this temperature as possible. One of the fundamental problems is that the moisture and volatiles from even the dried wood-fibers are typically gradually released, as long as it is being heated. No matter how much it has been devolatilized, these volatiles typically contribute to the foaming of plastic/wood-fiber composites.

Accordingly, it would be advantageous to minimize the effect of the moisture and temperature release by minimizing the $H_2O$ component at the foaming stage.

SUMMARY OF INVENTION

In one aspect of the invention a process for producing plastic/wood fiber composite foamed structures includes the steps of pre-drying wood fiber filler, mixing it with plastic to form a mixture; feeding the mixture into an extruder; introducing and mixing a blowing agent; subject the mixture to high shear forces and extruding the mixture to produce a plastic/wood fiber composite foamed structure. The wood fiber filler has a degradation temperature and an active volatization temperature. During the pre-drying step the temperature is maintained below the degradation temperature to produce dried wood fiber filler. During the mixing step the dried wood fiber filler the mixing temperature is maintained below an active volatilizing temperature. During the introducing and mixing step a blowing agent is introduced into the plastic/wood fiber mixture and is mixed therewith to produce a plastic/wood fiber/gas mixture. During the subjecting step the plastic/wood fiber/gas mixture is subjected to high shear forces in the presence of high pressures and the processing temperature is maintained below an active volatilizing temperature.

In another aspect of the invention a process for producing plastic/wood fiber composite foamed structures includes the steps of pre-drying wood fiber filler; mixing it with plastic to form a mixture; feeding the mixture into and extruder; mixing a physical blowing agent with the mixture; subjecting the mixture to high shear forces and extruding the mixture. In the mixing step the dried wood fiber filler is mixed with plastic to produce a plastic/wood fiber mixture. In the feeding step the plastic/wood fiber mixture is fed into an extruder. In the mixing step a physical blowing agent is mixed into the plastic/wood fiber mixture to produce a plastic/wood fiber/gas mixture. In the subjecting step the plastic/wood fiber/gas mixture is subjected to high shear forces in the presence of high pressures. Thereafter the plastic/wood fiber/gas mixture is extruded to produce a plastic/wood fiber composite foamed structure.

The present invention encompasses the use of both, chemical blowing agents (CBA) and physical blowing agents (PBA), for producing fine-celled plastic/wood-fiber composite foams. Uniformly distributed fine cells enhance material properties such as tensile strength, toughness, impact strength, insulation and surface quality, in addition to reduction in cost.

The present invention utilizes a CBA or a PBA to generate gaseous material, which is dispersed or dissolved in the polymer matrix under high temperature and pressure. The dispersed gases become nuclei for the bubbles when the pressure is rapidly reduced at the die exit, whereas, the dissolved gases produce a large number of nuclei when subjected to a rapid pressure drop and/or sheer stress, leading to Spinodal decomposition of the dissolved gases from the polymer matrix [19], But these effects result in the creation of large number of bubbles which leads to the production a very fine cell structure in plastic/wood-fiber composite foams. The cell size and uniformity of distribution achieved with this invention, for producing wood-fiber/plastic composite foams, is far superior to what has been obtained in the prior arts.

A fine-celled structure is produced, by first dissolving the foaming gases into the polymer matrix, creating a large number of nucleation sites by using a nucleating agent and/or dispersed gas bubbles and/or a rapid pressure drop and/or a shear stress at the die exit and controlling the expansion by controlling the temperature of the extrudate melt and surface. If any gaseous material is not dissolved in the polymer matrix, it remains present in the form of liquefied bubbles within the polymer matrix and the resultant foam structure exhibits these bubbles, with enlarged size, superimposed upon the uniformly distributed small bubbles. This results in a composite with relatively a large cell size and a non-uniform cell structure.

As mentioned earlier, moisture and other volatile gases are released from the wood-fiber, even after it has been dried and/or devolatilized, whenever its temperature is elevated beyond or around the drying temperature. The solubility of $H_2O$ is very low in polymer and so, if it is present, it may remain un-dissolved in the melt and deteriorate the cell morphology. Also, the volatile gases may cause formation of big voids in the final products if the processing pressure is not high enough compared to the solubility pressures of the volatile gases. Accordingly, by determining the critical drying and processing temperature, the $H_2O$ and volatile emissions are minimized as much as possible to achieve this goal becomes crucial.

In order to determine a suitable drying and processing temperatures, the gravimetric behavior of wood-fiber is studied by using a thermal gravimetric analysis (TGA). Typically beyond 170° C., the wood-fiber devolatilization rate increases. Therefore, it is logical to assume that the degradation of wood-fiber is also severer beyond 170° C. This leads to two important conclusions. First, the drying temperature of wood-fibers is preferably maintained below 170° C., no matter which method of drying is adopted, such as on-line devolatilizing through a vent, oven drying, hot air convective drying, drying in K-mixer and the like. It should be noted that on-line devolatilization can also occur through the partially filled feed-section of the first extruder, in which case the vent may not be needed at all. Second, the maximum temperature in the processing is preferably maintained below 170° C.

Although preference is given to a drying temperature lower than 170° C. in order to prevent any damage to wood-fibers from thermal degradation, a short time exposure of wood-fibers to a temperature higher than 170° C., for drying or devolatilization, has proved to produce a fine-celled foam structure, without significant degradation of mechanical properties or any undesirable composite structures. Acceptable results have been obtained with the wood-fiber drying or devolatilizing temperature as high as 185° C. This holds true for all the processes (A to F) described in a later section.

BRIEF DESCRIPTION OF THE DRAWINGS

The invention will now be described by way of example only, with reference to the accompanying drawings, in which.

DETAILED DESCRIPTION OF THE INVENTION

Figure 1A:
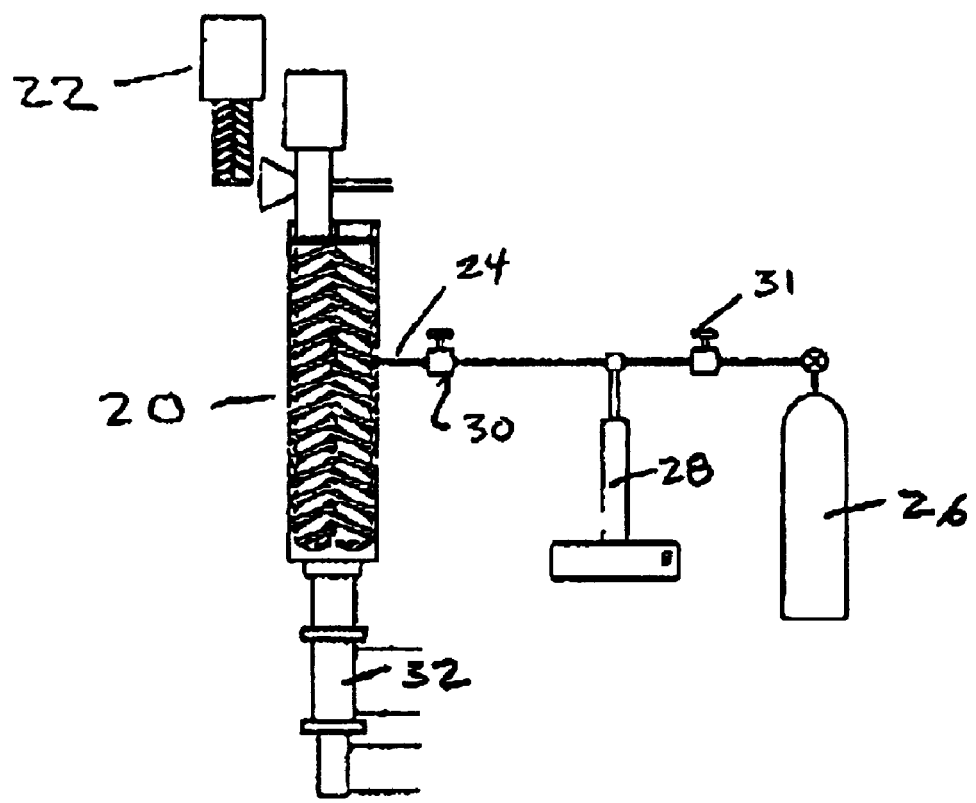
FIG. 1a is a schematic diagram of an extrusion process of the present invention and showing the injection of a physical blowing agent.

The objective of the invention is to produce fine-celled plastic/wood-fiber composite foams. A fine-celled structure is characterized by uniform distribution of a very large number of cells or voids. In order to ensure fine-celled morphology, the contents of moisture and other volatiles such as extractives of wood-fibers need to be reduced as much as practicable, using any of the standard drying techniques, such as, online devolatilization, oven drying, hot air convective drying, drying in K-mixer and the like. Generally the wood-fibres are dried as much as possible and heated to a temperature below the degradation temperature. That is the wood fiber should not be heated so high that the structural integrity of the wood is degraded. In the moisture or volatile-free mixture, a chemical blowing agent (CBA) or a physical blowing agent (PBA) is introduced with other additives, and the processing parameters are optimized so that the blowing gases are finely dispersed or dissolved into the polymer matrix under high temperature and pressure. The molten composite mixture or solution is subjected to a rapid pressure drop under predetermined processing conditions to produce fine-celled plastic/wood-fiber foams. Moreover, optionally adopting techniques for reducing the processing temperature can assist the shaping of extrudate and the control of foam density.

The above-described method can be embodied in at least the following six processes:

Process A: Drying or devolatilizing the moisture and other volatiles such as extractives, using any conventional technique, at a temperature lower than the degradation temperature and generally lower than 170° C. or slightly higher and using the PBA foaming process, in which the maximum processing temperature is maintained lower than the active volatilization temperature, generally 170° C., to generate a fine-celled structure in the plastic/wood-fiber composites.

Process B: Devolatilizing the moisture and other volatiles, through a vent at the intersection of two cascading extruders, at a temperature lower than the degradation temperature and generally lower than 170° C. and using the PBA foaming process, in which the maximum processing temperature is maintained lower than active volatilization temperature, generally 170° C., to generate a fine-celled structure in the plastic/wood-fiber composites.

Process C: Drying or devolatilizing the moisture and other volatiles, using any conventional technique, at a temperature lower than the degradation temperature and generally lower than 170° C. or slightly higher and using the CBA foaming process, in which the maximum processing temperature is restricted to the minimum level required to decompose the blowing agent and preferably is less than the active volatilization temperature, to generate a fine-celled structure in the plastic/wood-fiber composites.

Process D: Devolatilizing the moisture and other volatiles, through a vent at the intersection of two cascading extruders, at a temperature lower than the decomposition temperature of the CBA and preferably lower than the degradation temperature, and using the CBA foaming process, in which the maximum processing temperature is restricted to the minimum level required to decompose the blowing agent and preferably is lower than the active volatilization temperature, to generate a fine-celled structure in the plastic/wood-fiber composites.

Process E: Utilizing the volatile emissions given out by the wood-fiber to generate a fine-celled structure in the plastic/wood-fiber composites without using any blowing agent, and using a single extrusion system with pre-dried wood-fibers, in which substantial volatile material has been removed during the drying process.

Process F: Utilizing the volatile emissions given out by the wood-fiber to generate a fine-celled structure in the plastic/wood-fiber composites without using any blowing agent, and using a tandem extrusion system with a devolatilizing vent using un-dried wood-fibers.

Process A

For process A, the present invention focuses on removal of moisture and/or other volatiles such as extractives of wood-fiber and utilization of a gaseous PBA for fine-celled foaming of plastic/wood-fiber composite foams with a significantly improved cell structure. The main advantages of using an inert PBA, are that it is non-hazardous and more economical than other blowing agents. The PBA used can be any of the non-reactive gases such as $CO_2$, $N_2$, He, Ar, Air, etc., or a mixture of these gases in any combination and proportion. When the PBA is injected in the extruder barrel, it usually acquires a supercritical state. The processing temperatures and pressures in the barrel are usually sufficiently high for this to happen, even though the injected PBA may be in a liquid, gas or super critical state. The supercritical point, i.e. the critical temperature and the critical pressure, of most of the non-reactive gases is lower than the conditions prevailing in the extruder barrel, so that the above statements apply to nearly all of them.

The processing conditions in the barrel are maintained so as to dissolve, or well disperse, all the gas in the supercritical state into the polymer matrix. The dissolution of the gas into the polymer will depend upon the solubility of the gas in the polymer at the barrel temperature and pressure. We can choose to inject, either a soluble amount of gas or, if needed, an amount greater than the solubility limit and cause it to be finely dispersed by adjusting the conditions in the barrel. Since the solubility of gas in the polymer is almost proportional to the pressure, the injected gas will not be completely dissolved in the polymer if the pressure is lower than the solubility pressure. Although the cell structure is observed to be better, in general, by completely dissolving the gas, according to our experimental results, very fine cell structures have also been achieved by finely dispersing the gas bubbles using an effective mixing device. Whether the injected gas completely dissolves in the polymer or not, a fine cell foam can be made from the plastic/wood-fiber composites using the developed systems as long as the volatiles are not generated from the wood-fibers during processing.

Extensive experimental results show that the volatiles, including moisture, coming out of the wood-fiber during extrusion processing in general deteriorate the cellular structure of plastic/wood-fiber composite foams. In order to produce a fine-celled structure, the role of the blowing agent should be dominant and the role of the volatiles should be minimized. In order to minimize the amount of volatiles coming out of wood-fibers during processing, the wood-fiber should be dried or devolatilized enough and the processing temperature should be maintained low enough so that additional evaporation of volatiles is reduced.

In brief, the strategy adopted is that, the wood-fibers are pre-dried or pre-devolatilized by using any one of the commonly used industrial methods, such as, oven drying, hot air convective drying, drying in K-mixer and the like, while maintaining the drying temperature below the degradation temperature and generally lower or slightly higher than 170° C. Then the dried wood-fiber is mixed with the polymer powder/pellets, a coupling agent, and a cell-nucleating agent, such as talc, in a dry blending tumbler to generally achieve homogeneity. The blended mixture is then fed into an extruder through a feeder. A special feeder may be required because the natural adhesiveness of the wood fiber may prevent the mixture from being gravity-fed into the extruder from the hopper. The pre-dried wood-fibers and additives are plasticized and uniformly dispersed in the plastic matrix, in the initial section of an extruder. The PBA is injected and dispersed or dissolved in mid and final zone of the extruder. The temperature of the melt can be reduced optionally and finally it is extruded through a die with a rapid pressure drop (more than 1000 psi across the die) to induce large nucleation. The temperature of the melt may not have to be decreased for high-density applications. Controlling the die and melt temperatures controls the expansion ratio.

In order to maximize the removal of the volatiles, including moisture, while preventing degradation, the wood-fibers are dried at a temperature below the degradation temperature and generally lower or slightly higher than 170° C. In extrusion processing, care should be taken that the processing temperature does not exceed the drying temperature. It was found that at higher temperatures, the moisture is continually released at a gradual rate, even if it has been completely dried at that temperature. In other words, additional moisture is released even though the wood-fiber has been pre-dried at the processing temperature, and the amount of this moisture will depend upon the extrudates' residence time and processing temperature in the equipment. Thus, an additional important processing parameter is to minimize the residence time so that the moisture content can be minimized while maintaining or preferably decreasing the processing temperature below the active volatilization temperature generally below 170° C.

The use of PBA is particularly suited for this process, as the higher temperature required to decompose a CBA is not needed. Another beneficial effect of using the inert gas $CO_2$ or $N_2$ (PBA) is that it has a plasticizing effect on the polymer/wood-fiber mixtures, therefore, not only would it aide in the dispersion of wood-fiber in the plastic, but would also enable higher content of wood-fiber to be used. The plasticizing effect may also enable materials, such as polypropylene (PP) and polystyrene (PS) for which a higher processing temperature is needed, to be processed at temperatures lower than 170° C., so that the detrimental effect of moisture or other volatiles may be reduced.

Process Description: FIGS. 1(a–d) show the different configurations possible for this process. In the preparatory stage, the wood-fibers are pre-dried or devolatilized by using any one of the commonly used industrial methods, such as, oven drying, hot air convective drying, drying in K-mixer and the like, while keeping the drying temperature below or slightly above 170° C. This is necessary to ensure that the volatiles do not evolve and deteriorate the cell morphology of the final extrudate in extrusion processing. Then the dried wood-fibers are mixed with the polymer powder/pellets, a coupling agent, and a nucleating agent, such as talc, in a dry blending tumbler. The blended mixture is then fed into an extruder 20 through a feeder 22. In this example the extruder 20 is a twin screw extruder but it could also be a single screw extruder. A special feeder may be used because the natural adhesiveness of the wood fiber may inhibit the mixture from being gravity-fed into the extruder 20 from the hopper.

This mixture is plasticated and further mixed in the initial sections of the screw. In the mid zone of the extruder, a metered amount of physical blowing agent (PBA) is injected into the polymer/wood fiber matrix at 24. For example as shown in FIG. 1a, the PBA is $CO_2$ which is stored in a PBA tank 26. A positive-displacement pump 28 may be used to inject the PBA into the mixture. A numeric controller or valve 30 is used to meter the flow of the PBA into the mixture. A second valve 31 is used for filling the pump with PBA from the PBA tank. During this filling process, the numeric controller or valve 30 between the pump 28 and the extruder 26 is closed. During extrusion foaming operation, the second valve 31 is closed and numeric controller is opened. This mixture is then subjected to high shear forces by the screw and/or by any type of mixers, in the presence of high pressure (typically the pressure is higher than 2000 psi). This ensures the complete dissolution or thoroughly uniform dispersion of the PBA gases into the polymer matrix. During this process some additional moisture or volatiles may be released from the wood-fiber, but this is difficult to avoid. To reduce these emissions, the residence time in extruder 20 should be minimized. Optimally, the melt temperature of the polymer/gas mixture can be homogeneously reduced in a heat exchanger 32. A commonly well-known static mixer in a cooling heat exchanger wherein the mixer has vanes positioned such that the core fluid is transported away from the center and the peripheral material is moved to the core. The mixer housing is enclosed in a jacket through which the cooling fluid flows. Such a mixer is shown in FIG. 1a may be used. The mixture passes from the heat exchanger 32 to a die 36.

Figure 1B:
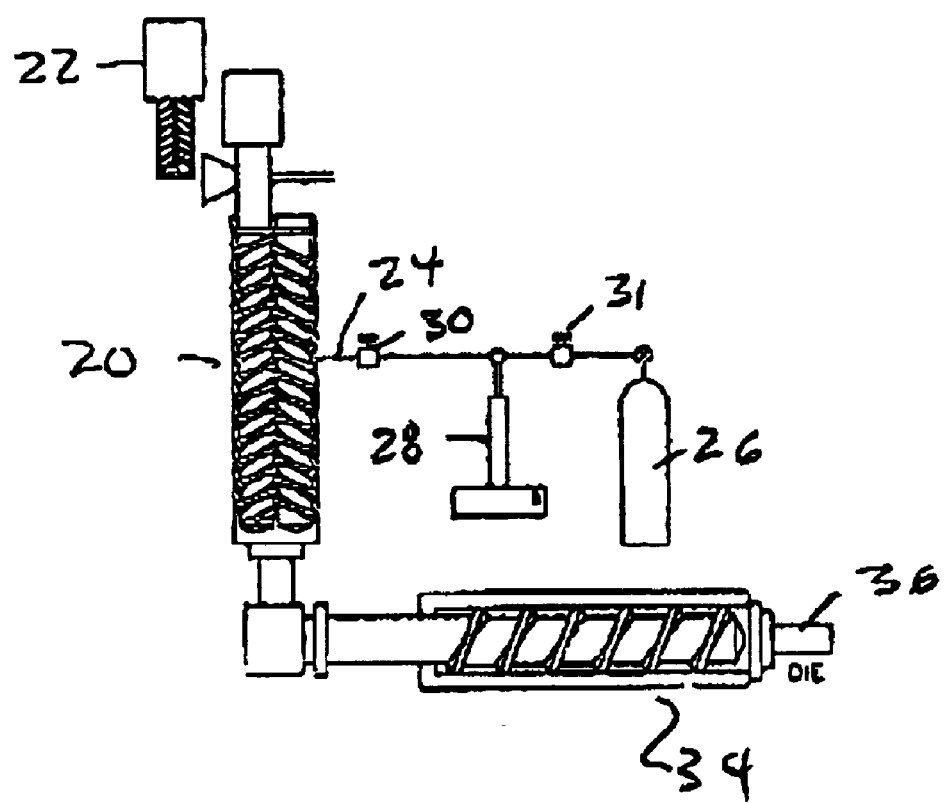
FIG. 1b is a schematic diagram of an extrusion process similar to that shown in FIG. 1a but showing a cooling extruder.

For high wood-fiber content a cooling extruder 34, shown in FIG. 1b, may be used as a cooling device instead of a heat exchanger with a static mixer. Added cost of an extruder can be justified by achieving higher pressure at the die if cooling is required. The extrudate finally passes through the die where its pressure is rapidly dropped, which produces a large number of nucleation sites due to the Spinodal decomposition of polymer and gas. The gas from the adjacent polymer matrix diffuses into these sites and causes expansion. The temperature of the die can be controlled so as to freeze the surface layer of the polymer, which prevents the diffusion of gases into the atmosphere. This in turn helps in achieving expansion. The die temperature can also be lowered to control the unfoamed skin thickness of the extrudate for the profile dies. The profile dies can be based on the Celuka die [23, 24], where a dividing mandrel is inserted and foaming is induced to occur inward. The art of Celuka die is well known as described in references 23 and 24. The profile die can also be of other non-Celuka designs.

Figure 1C:
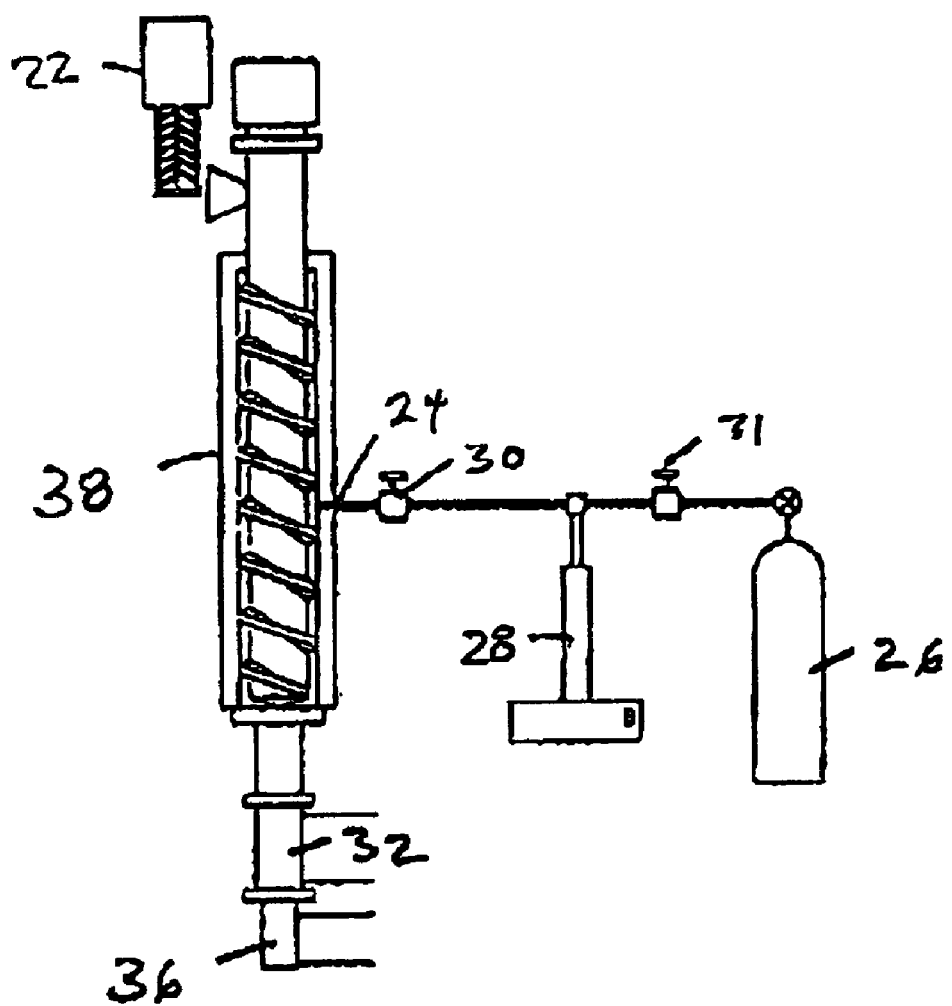
FIG. 1c is a schematic diagram of an extrusion process similar to that shown in FIG. 1a but showing a single screw extruder instead of a twin screw extruder.
Figure 1D:
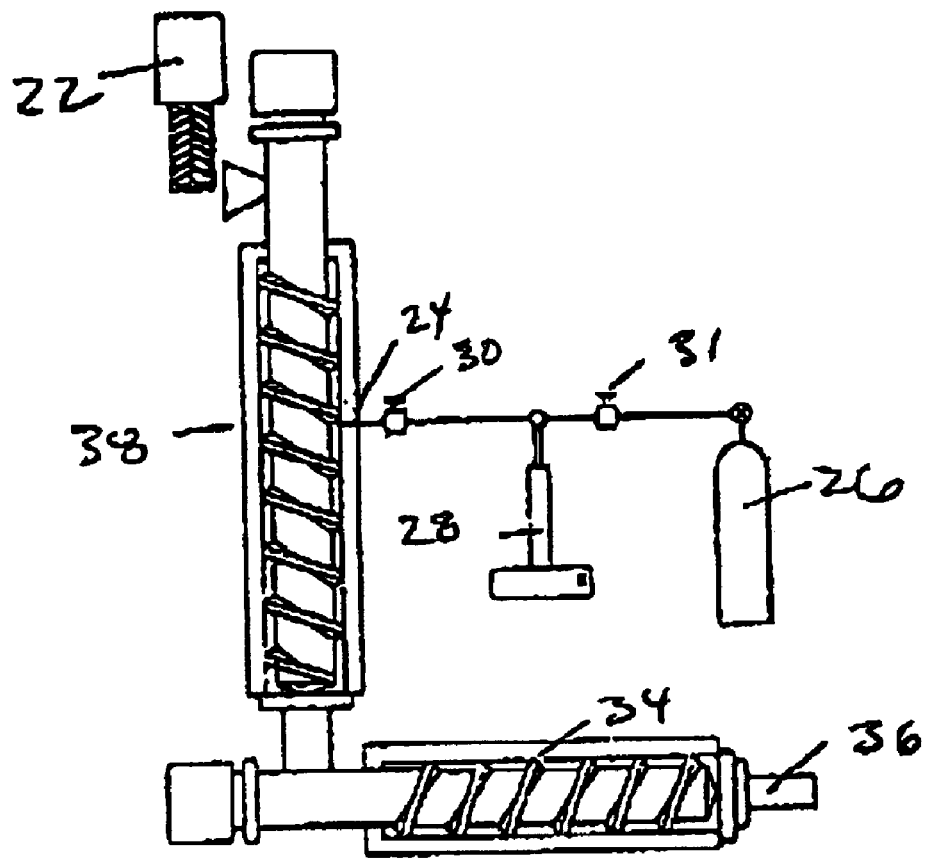
FIG. 1d is a schematic diagram of an extrusion process similar to that shown in FIG. 1a but showing a single screw extruder instead of a twin screw extruder and a cooling extruder.

FIGS 1c and 1d illustrate the use of a single screw extruder 38 instead of a twin screw extruder shown in FIGS. 1a and 1b. Otherwise the configurations shown in FIG. 1c and 1d correspond with FIGS. 1a and 1b, respectively.

EXAMPLE FOR PROCESS A

Material

High-density polyethylene (HDPE 2710) supplied by Nova Chemicals was utilized in the experiments. The 05 wt % wood-fibers used were standard softwood (pine) grade 12020, supplied by American Wood Fibers. The physical blowing agent (PBA) was commercial $CO_2$ from Matheson Gas Products. 3 wt % coupling agent was used for improving the adhesion between the hydrophobic PE and the hydrophyllic wood-fiber. The coupling agent was Fusabond adhesive resin E-MB-100D from Dupont, Canada. Wood-fibers were dried in vacuum oven at 105° C. for 12 hours to remove the moisture and volatiles. All the materials were used as received Experimental Setup and Procedure A schematic of the equipment for process A is shown in FIG. 1a. In the preparatory stage, wood-fiber oven-dried at 105° C. for 12 hours is mixed with the polymer powder/pellets, a coupling agent, and a nucleating agent such as talc in a dry blending tumbler, and fed into the extruder 20, using a feeder 22.

A metered amount of $CO_2$ (4 wt %) was injected into the molten polymer/wood-fiber mixture at 24 in the barrel, using a positive displacement pump. In experimental setup herein the injection site was about $\frac{2}{3}^{rd}$ away from inlet. However, it will be appreciated by those skilled in the art that the actual location is not important as long as the polymer has been already melted completely by the time the melt gets to the location of the gas-injection port and as long as the pressure at this port is high enough to be able to dissolve all the injected gas. The pressure in the extruder and downstream was maintained high enough to expedite dissolution of $CO_2$ into the plastic matrix. However, the processing temperature was not increased over 155° C. to minimize the release of further moisture or volatiles and to prevent the thermal degradation of wood-fiber. The temperature of the melt was then homogeneously lowered in a heat exchanger 32. Finally, it was extruded out through a die 36 where the surface temperature was further reduced to stabilize the foam. Samples were taken at various nozzle temperatures for density measurement and cell morphology characterization Results The removal of moisture and other volatiles, injection of $CO_2$, dissolution of $CO_2$, cooling, and the rapid pressure drop (more than 1000 psi across the die) resulted in a significant improvement of the cell structure of foams. The scanning electron micrographs (SEMs) of the foams produced on the system described herein clearly reveal that the cell structure was much more regular and smaller in size when compared to the foam structure obtained using un-dried wood-fibers. The largest cells were smaller than 200 microns and the distribution of cell size was very uniform. The density of HDPE/wood-fiber composite foams was successfully controlled to be in the desired range of 0.5 $g/cm^3$ to 0.8 $gl^3$ by controlling the amount of PBA and the die temperature.

The surface quality was dramatically improved with the dried wood-fibers. Foams obtained from un-dried wood-fibers from single extruder system exhibited a very non-uniform cell structure and a rough surface. The cross-sectional dimensions were very irregular and blister like bubbles were present on the surface. For the foams produced by the process described herein, the surface finish was smooth and regular.

Process B

Most of the prior art drying methods for drying the wood fibers suffer from two disadvantages. Firstly, they involve costly batch processing which is not desirable for continuous processes. Secondly, the wood-fiber cannot be heated to a temperature higher than 100° C. for a longer period without causing its degradation with the presence of Oxygen. To overcome some of these disadvantages cascade extruders may be used for devolatilization and removal of moisture and other volatiles while the molten plastic is transferred from one extruder (or compounder) to the second extruder in a tandem or cascade arrangement. Controlling the material feed rate from the first extruder into the second extruder controls the material loss at the vent. If there is any flow out of the vent, it can be suppressed by reducing the rotational speed of the first extruder and/or by reducing the feed rate into the hopper.

Figure 8:
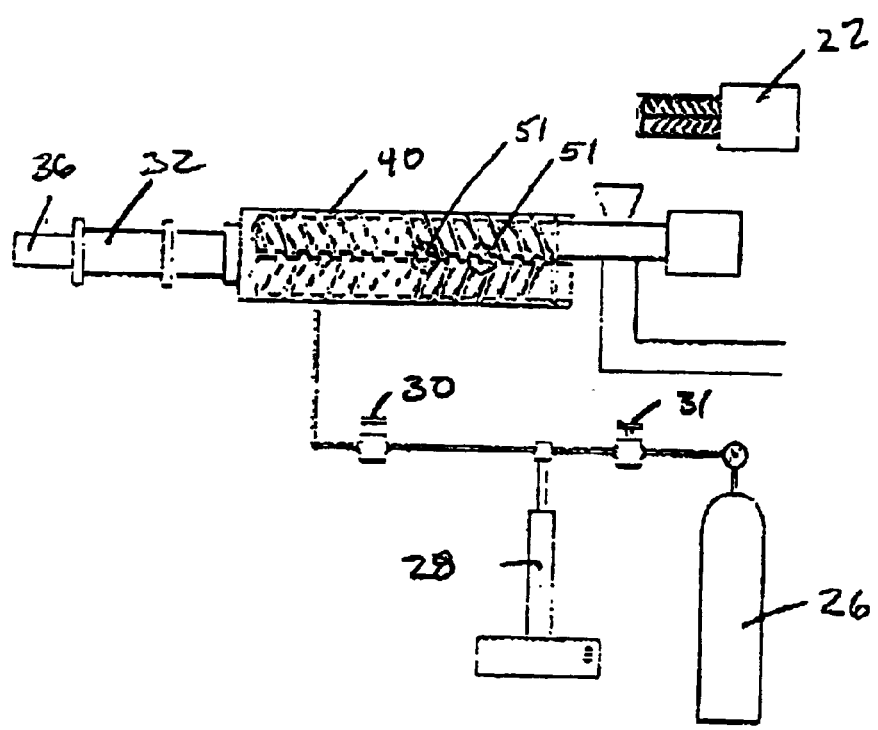
FIG. 8 is a schematic diagram of an extrusion process similar to that shown in FIGS. 2a & c but showing a single twin screw extruder with vent holes instead of a vent at the interconnection of two extruders.
Figure 9:
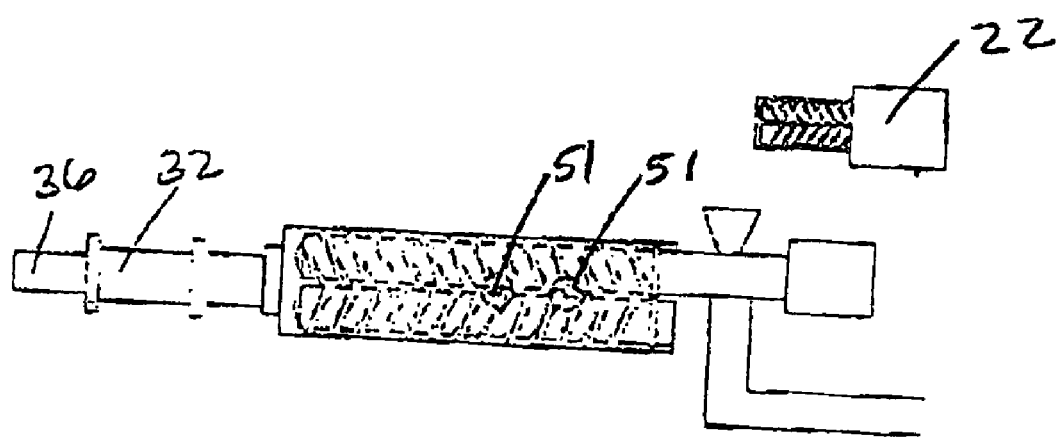
FIG. 9 is a schematic diagram of an extrusion process similar to that shown in FIGS. 4a & c but showing a single twin screw extruder with vent holes instead of a vent at the interconnection of two extruders.

Process Description: Process B is a subset of process A in which online devolatilization, instead of separate batch process drying, is used for purging out the moisture and other volatiles from the plastic/wood-fiber/additives mixture. The strategy adopted is that, the un-dried wood-fibers, plastic and additives are dry blended and the blended mixture is then fed into an extruder through a feeder 22. The first extruder 40 can be a single or twin-screw mixing extruder or compounder, where plastication and mixing takes place. During this process most of the moisture and other volatiles are evaporated due to the elevated temperature (typically between 145° C. to 170° C.). The molten mixture is then devolatilized at a vent 41 in a cascade extrusion system and conveyed into the second extruder. On-line devolatilization can be accomplished within the first extruder if a twin screw extruder is used as the first extruder, and devolatilizing ports 51 can be opened along the screws as shown in FIGS. 8 and 9.

In the second extruder 42, a metered amount of physical blowing agent (PBA) is injected into the polymer/wood fiber matrix at 44. This mixture is then subjected to high shear forces by the screw and/or by any type of mixers, in the presence of high pressures (typically the pressure is above 2000 psi). This ensures the complete dissolution or thoroughly uniform dispersion of the PBA gases into the polymer matrix. During this process some additional moisture or volatiles may be released from the wood-fiber, but this is difficult to avoid. To reduce these emissions, the residence time should be minimized. Optionally, the melt temperature of the polymer/gas mixture can be homogeneously reduced in a heat exchanger 32. A commonly well-known static mixer in a cooling heat exchanger shown in FIG. 2*a* can be used.

Figure 2A:
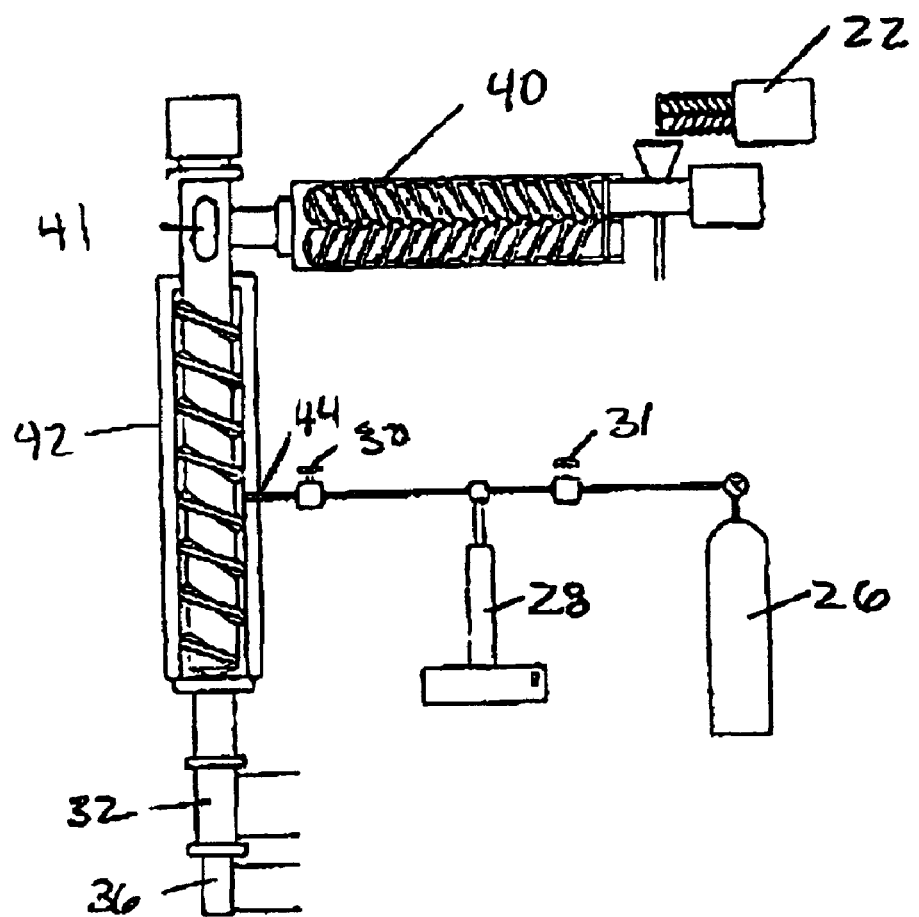
FIG. 2a is a schematic diagram of an alternate extrusion process of the present invention and showing the injection of a physical blowing agent and the use of a cascade devolatilisation system having a twin screw extruder followed by a single screw extruder.
Figure 2B:
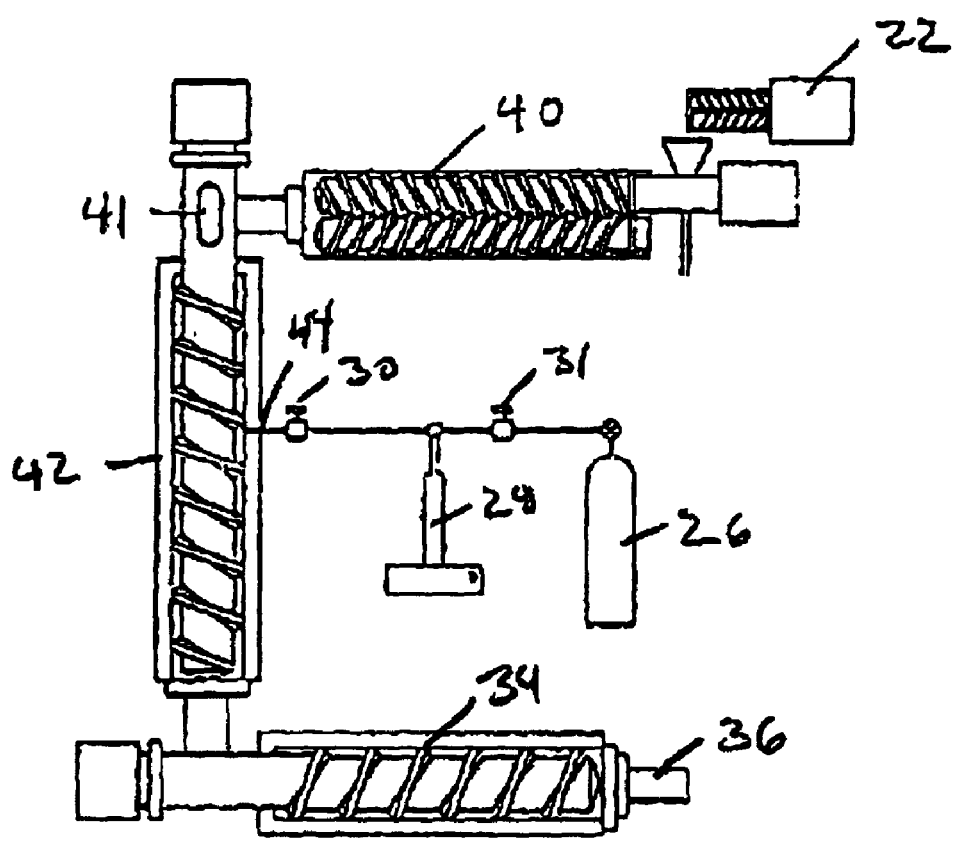
FIG. 2b is a schematic diagram of an extrusion process similar to that shown in FIG. 2a but showing a cooling extruder.
Figure 2C:
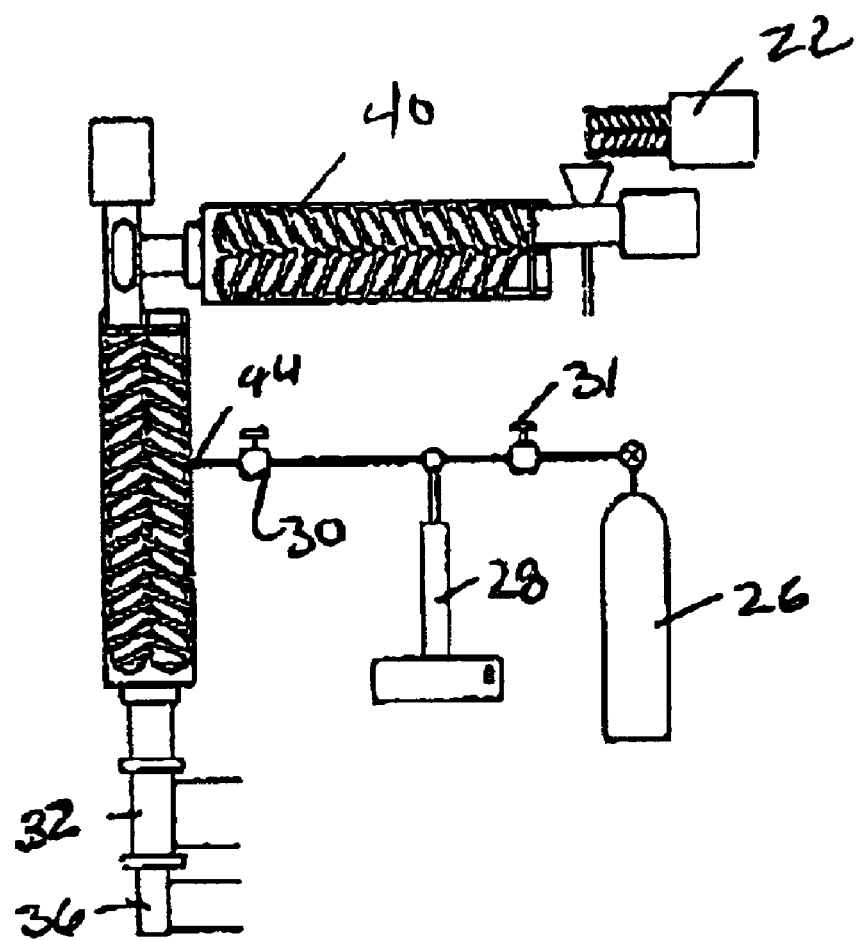
FIG. 2c is a schematic diagram of an extrusion process similar to that shown in FIG. 2a but showing a twin screw extruder instead of a single screw extruder as the second extruder.
Figure 2D:
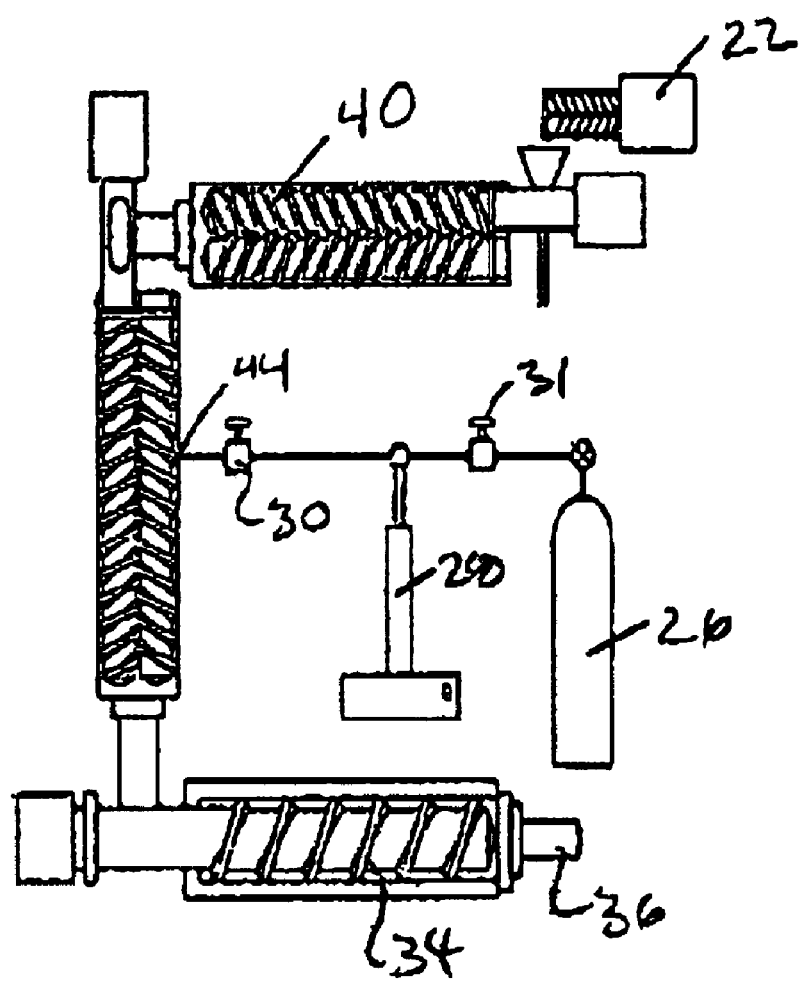
FIG. 2d is a schematic diagram of an extrusion process similar to that shown in FIG. 2a but showing a twin screw extruder instead of a single screw extruder as the second extruder and a cooling extruder.

As above, for high wood-fiber content a cooling extruder 34, shown in FIG. 2*b*, can be used as a cooling device instead of a heat exchanger 32 with a static mixer. The extrudate finally passes through the die 36 where its pressure is rapidly dropped, which produces a large number of nucleation sites due to the Spinodal decomposition of polymer and gas. The gas from the adjacent polymer matrix diffuses into these sites and causes expansion. The temperature of the die can be controlled by a cooling jacket and a band beater so as to freeze the surface layer of the polymer, which prevents the diffusion of gases into the atmosphere. This in turn helps in achieving expansion. The die temperature can also be lowered (from around 150° C. down to melting temperature of PE, which is typically around 130° C.) to control the unfoamed skin thickness of the extrudate for the profile dies. The profile dies can be based on the Celuka die [23, 24], where a dividing mandrel is inserted and foaming is induced to occur inward. The profile die can also be of other non-Celuka designs.

In regard to processes A and B, the results were observed to be best when the highest processing temperature was maintained lower than 170° C. It seems that processing the composites under 170° C. substantially prevented the generation of moisture and other volatiles. The TGA analysis also confirmed this observation, as it was observed that the weight loss rate of wood-fibers increased at temperatures higher than 170° C.

It seemed that a severe degradation of wood-fiber occurs and thereby severe deterioration of mechanical properties of plastic/wood-fiber composites occurs above 205° C. However, even before the degradation of the mechanical properties of wood-fiber, there seems to be an excessive amount of weight loss above 170° C., according to the TGA results. This is probably due to the evaporation of some of the extractives/volatiles, when heated above 170° C. Although the mechanical properties may not be appreciably affected due to loss of some of these extractives/volatiles, the evaporation of these materials significantly contributes to the deterioration of foam structure. Therefore, it is preferably to reduce these emissions by minimizing the processing temperatures and residence time, even if the wood-fibers were well devolatilized before processing.

EXAMPLE FOR PROCESS B

Material

HDPE Grade 2710 from Nova was used as the base polymer for the composites. 50 wt % standard wood-fibers softwood grade 12020, supplied by American Wood Fibers, were used. 3 wt % coupling agent (Fusabond adhesive resin E-MB-100D from Dupont, Canada) was used for improving the adhesion between the PE and the wood-fiber. Commercial $CO_2$, upto 4 wt %, from Matheson Gas was used as the PBA. All the materials were used as received.

Experimental Setup and Procedure

A schematic of the equipment for process B is shown in FIG. 2*a*. In the preparatory stage, un-dried wood-fiber is mixed with the polymer powder/pellets, a coupling agent, and a nucleating agent such as talc in a dry blending tumbler, and fed into the first twin-screw extruder 40, using a feeder 22. The temperature at the exit of this extruder was maintained at the highest processing temperature, which in this case was 180° C., for completely vaporizing the moisture and other volatiles from the wood-fiber. The output of this extruder was fed into the second extruder. At the interconnection, which was open to atmosphere, generally all the vaporized volatiles were devolatilized and the moisture and generally volatile-free mixture was conveyed into the second extruder by the motion of the screw.

A metered amount of $CO_2$ was injected into the molten polymer/wood-fiber mixture at 44 in the middle of the barrel of the second extruder 42, using a positive displacement pump 28. The pressure in the second tandem extruder 42 and downstream was maintained high enough (typically the pressure is above 2000 psi) to expedite dissolution of $CO_2$ into the plastic matrix. The temperature of the melt was then homogeneously lowered in a heat exchanger 32. Finally, it was extruded out through a die 36 where the surface temperature was further reduced to stabilize the foam. Samples were taken at various nozzle temperatures for density measurement and cell morphology characterization.

Results and Discussion

The foam density of HDPE/wood-fiber composites produced, using the tandem extrusion system with a devolatilizing vent at the interconnection was successfully controlled in the range of 0.5 to 0.8 g/cm³. The cell morphology of the foams produced was very uniform with the largest cell size being under 150 microns. The surface quality of the foams was very good too.

Process C

For process C, the present invention focuses on moisture removal and utilization of a CBA for fine-celled foaming of plastic/wood-fiber composite foams with a significantly improved cell structures. The basic strategy adopted is same as described for process A, with the difference that the CBA is dry blended along with plastic and wood-fiber before being fed into an extruder in which the resin is plasticated and the mixture is conveyed further into the extruder where it is heated so that the CBA is decomposed and releases all its gaseous contents. Further processing is again similar to that described for process A.

Figure 3A:
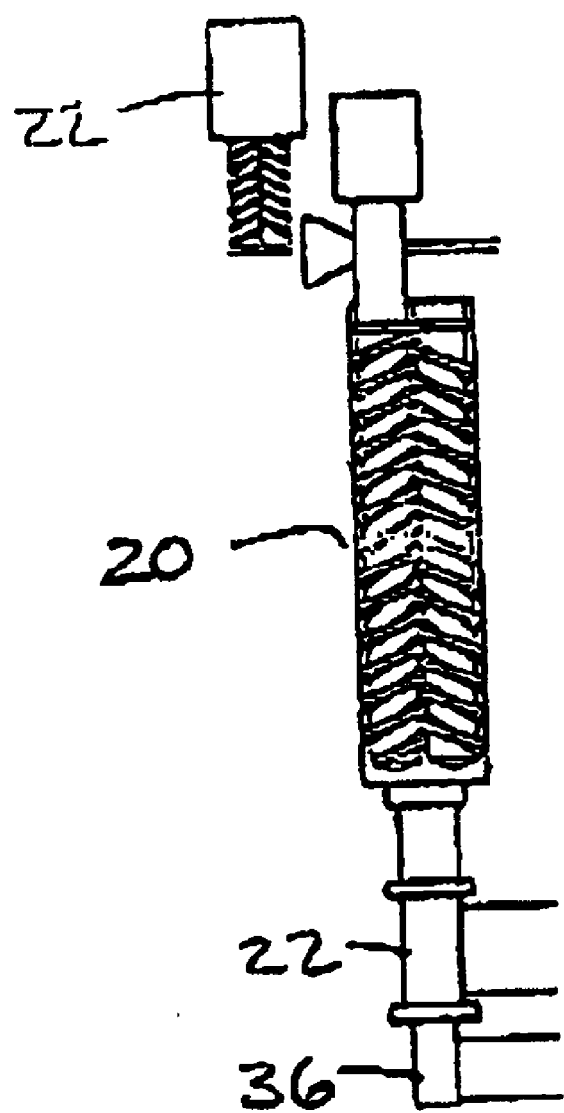
FIG. 3a is a schematic diagram of an extrusion process of the present invention and using a chemical blowing agent.

Process Description: In the preparatory stage, the wood-fibers are pre-dried by using any one of the commonly used industrial methods, such as, oven drying, hot air convective drying, drying in K-mixer and the like, while maintaining the drying temperature below or slightly higher than 170° C. The drying temperature can be even very high up to the decomposition temperature of the CBA to be used, which may cause slight degradation of the wood-fiber. However, drying over 205° C. should be avoided because of the severe degradation of the wood-fiber, This reduces the moisture and other volatiles, and thereby reduces the deterioration of the cell morphology of the final extrudate. Then the dried wood-fiber is mixed with the polymer powder/pellets, a CBA, a coupling agent, and a nucleating agent, such as talc, in a dry blending tumbler. The blended mixture is then fed into an extruder 20 through a feeder 22. This arrangement is shown in FIG. 3a and is similar to those discussed above in regard to FIGS. 1a and 2a but there is no injection of a PBA.

This mixture is plasticated and further mixed in the initial sections of the screw. In the last zone 23 of the extruder the temperature is increased so as to decompose the CBA. During this process some additional moisture or volatiles may be released from the wood-fiber, but this is difficult to avoid for CBA processing unless the drying temperature was as high as the decomposition temperature of CBA. To reduce these emissions, the residence time should be minimized. This mixture is then subjected to high shear forces by the screw and/or by any type of mixers, in the presence of high pressures (typically the pressure is above 2000 psi). This facilitates the dissolution or dispersion of the decomposed gases into the polymer matrix. The melt temperature of the polymer/gas solution is reduced to about 150° C. Lower limit is determined by material and its MFI. In some cases it can go even below 140° C. in a heat exchanger 22. A commonly well-known static mixer in a cooling heat exchanger shown in FIG. 3a can be used.

Figure 3B:
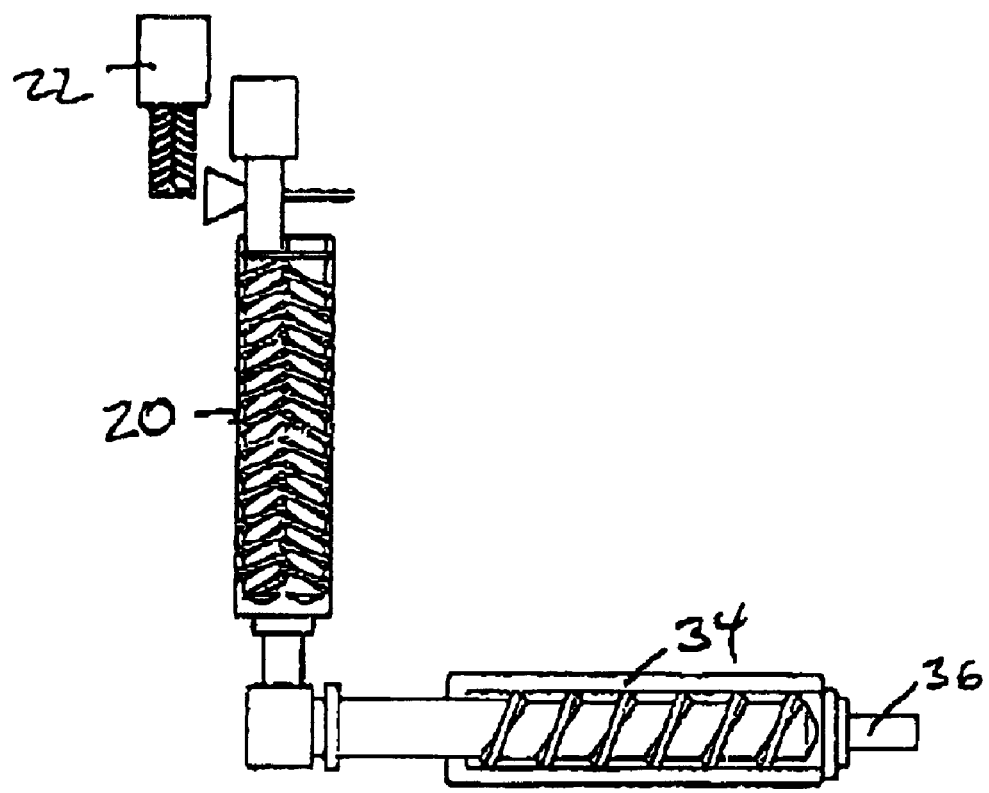
FIG. 3b is a schematic diagram of an extrusion process similar to that shown in FIG. 3a but showing a cooling extruder.

For a high wood-fiber content, a cooling extruder 34, as shown in FIG. 3b, can be used as a cooling device instead of a heat exchanger with static mixer. The extrudate finally passes through the die where its pressure is rapidly dropped, which produces a large number of nucleation sites due to the Spinodal decomposition of polymer and gas. The gas from the adjacent polymer matrix diffuses into these sites and causes expansion. The temperature of the die can be controlled so as to freeze the surface layer of the polymer, which prevents the diffusion of gases into the atmosphere. This in turn helps in achieving expansion.

Figure 3C:
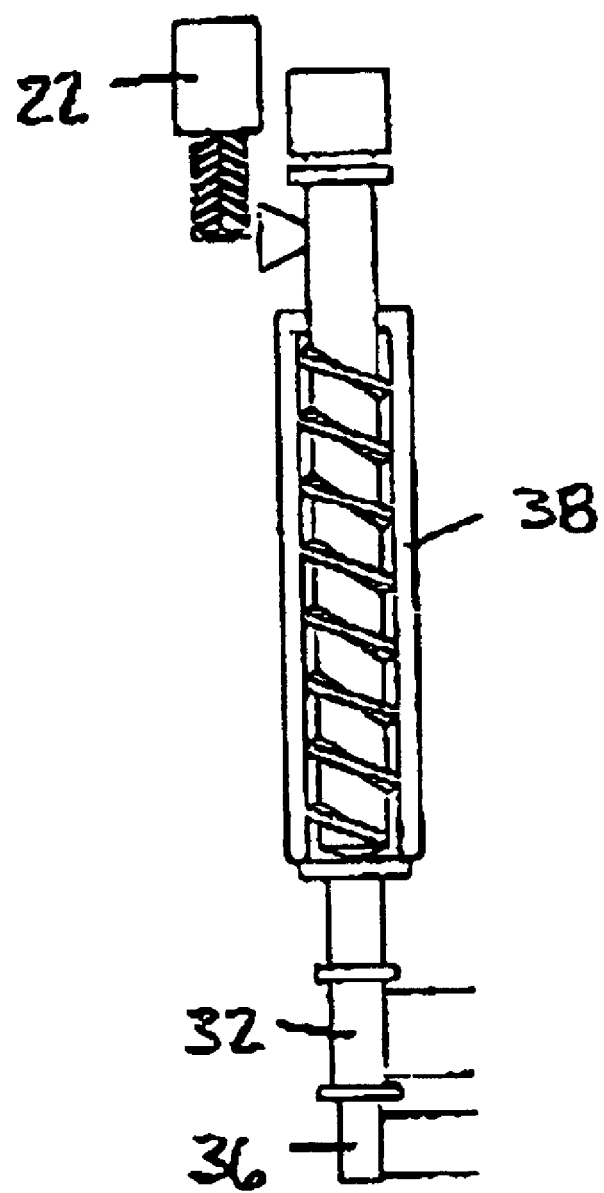
FIG. 3c is a schematic diagram of an extrusion process similar to that shown in FIG. 3a but showing a single screw extruder instead of a twin screw extruder.
Figure 3D:
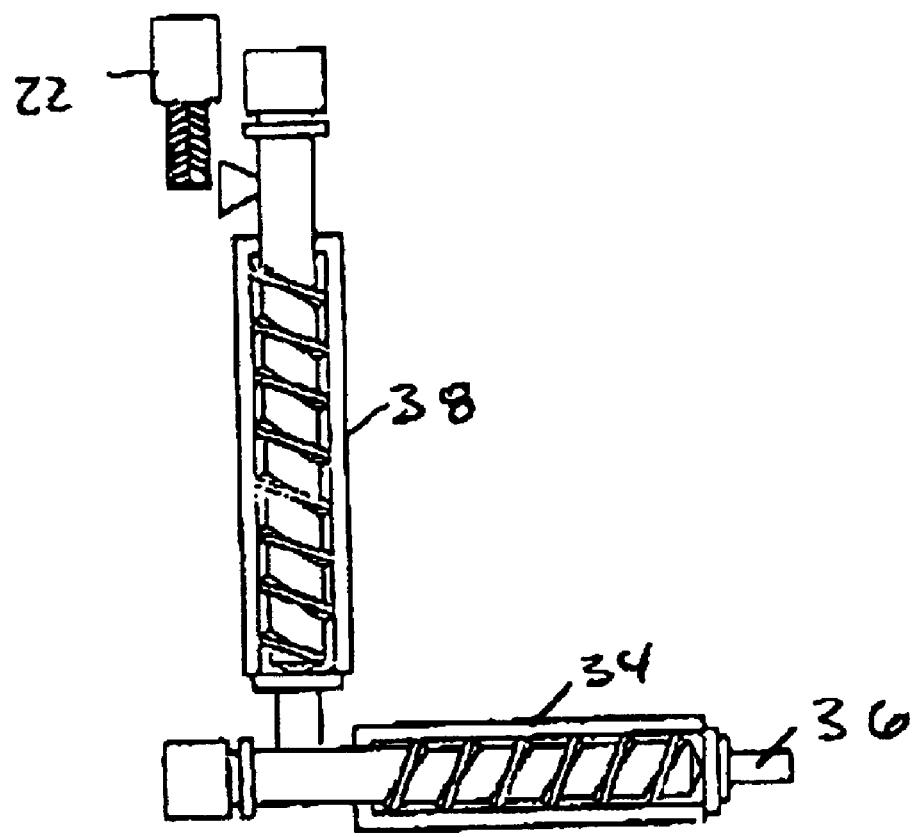
FIG. 3d is a schematic diagram of an extrusion process similar to that shown in FIG. 3a but showing a single screw extruder instead of a twin screw extruder and a cooling extruder.

FIGS. 3c and 3d show the other configurations possible for this process. Specifically FIG. 3c is similar to FIG. 3a but shows a single screw extruder 38 rather than a twin screw extruder 20. Similarly FIG. 3d is similar to FIG. 3b and it shows a single screw extruder 38 rather than a twin screw extruder 20.

Process D

As discussed above, an efficient method, which offers many advantages, is to use cascade devolatilization and to remove moisture while the molten plastic is transferred from one extruder (or compounder) to the second extruder in a tandem arrangement. This may also be used in association with the CBA process.

Process Description: Process D is a subset of process C in which online devolatilization is used for substantially purging out the moisture and other volatiles from the plastic/wood-fiber/additives mixture. In the preparatory stage, the un-dried wood-fiber is mixed with the polymer powder/pellets, a CBA, a coupling agent, and a nucleating agent, such as talc, in a dry blending tumbler. The blended mixture is then fed into the first extruder 20 through a feeder 22. This arrangement is similar to that shown in FIG. 2a but it does not include the injection of a PBA.

The first extruder 40 can be a single or twin-screw mixing extruder or compounder, where plastication and mixing takes place. During this process most of the moisture and other volatiles are evaporated through the hopper due to the elevated temperature. The molten mixture is then devolatilized at a vent in a cascade extrusion system and conveyed into the second extruder 42. Care should be taken that the temperature at the vent should not be high enough to decompose the CBA. As noted previously, on-line devolatilization can be accomplished within the first extruder if a twin screw extruder is used as the first extruder, and devolatilizing ports can be opened along the screws.

In the second extruder 42, the temperature of the molten mixture is elevated so as to decompose the CBA. During this process some additional moisture or volatiles will be released from the wood-fiber, but this is difficult to avoid. To reduce these emissions, the residence time should be minimized. This mixture is then subjected to high shear forces by the screw and/or by any type of mixers, in the presence of high pressures and temperatures. This facilitates the dissolution or dispersion of the gases evolved from the CBA, into the polymer matrix. The melt temperature of the polymer/gas mixture is reduced in a heat exchanger. A commonly well-known static mixer in a cooling heat exchanger shown in FIG. 4a can be used.

Figure 4A:
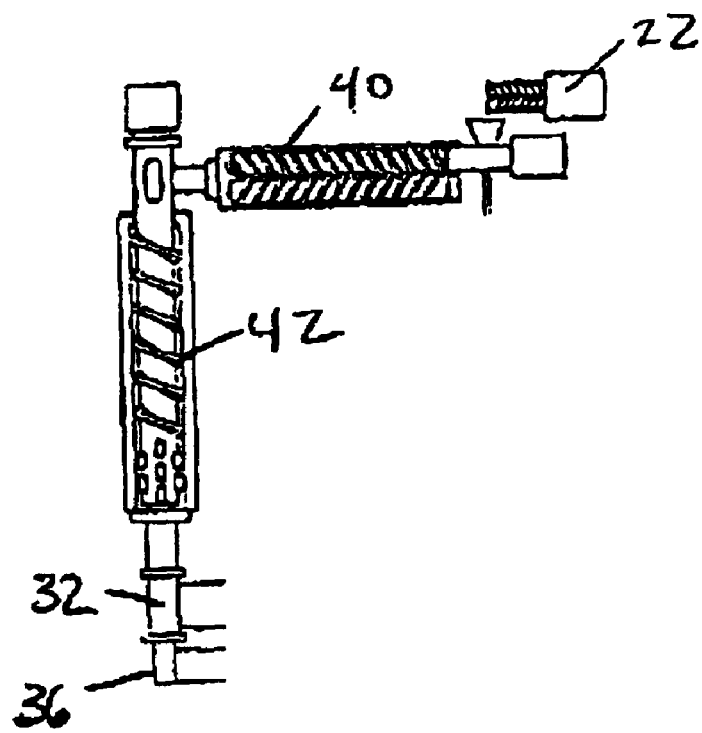
FIG. 4a is a schematic diagram of an alternate extrusion process of the present invention using a chemical blowing agent and showing the use of a cascade devolatilisation system having a twin screw extruder followed by a single screw extruder.
Figure 4B:
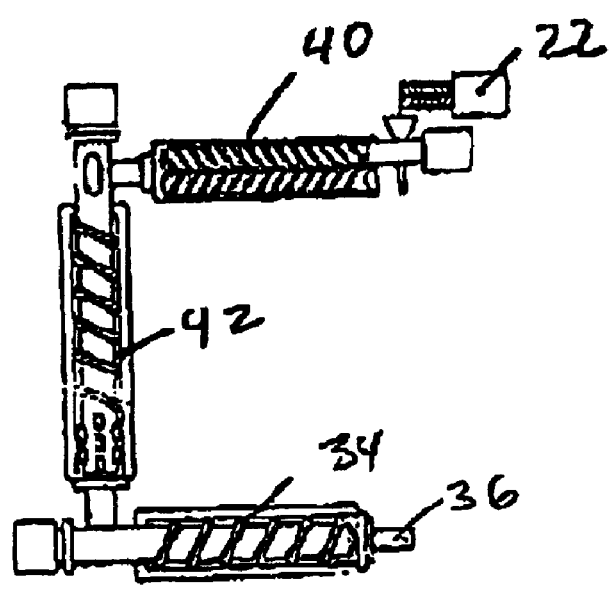
FIG. 4b is a schematic diagram of an extrusion process similar to that shown in FIG. 4a but showing a cooling extruder.
Figure 4C:
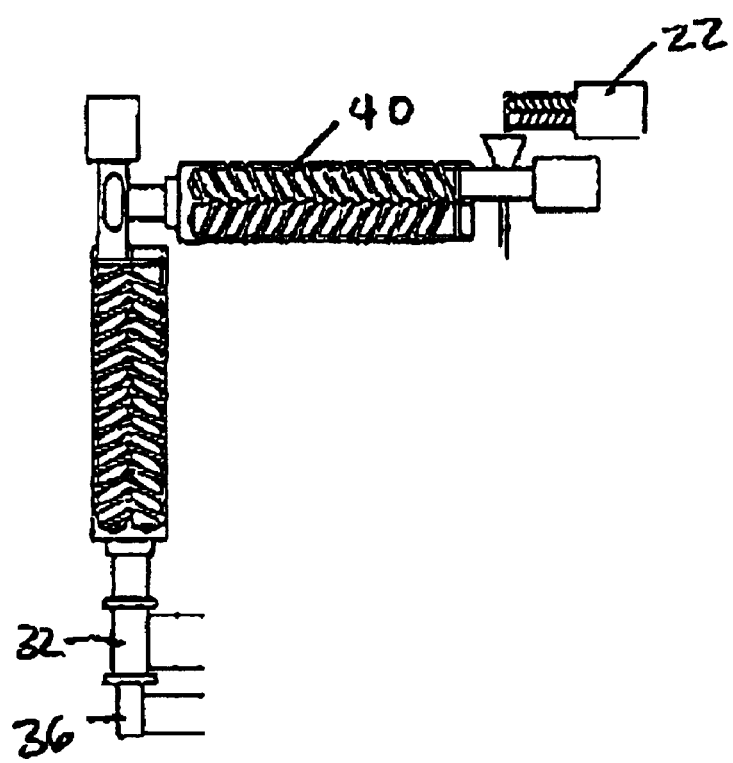
FIG. 4c is a schematic diagram of an extrusion process similar to that shown in FIG. 4a but showing a twin screw extruder instead of a single screw extruder as the second extruder.
Figure 4D:
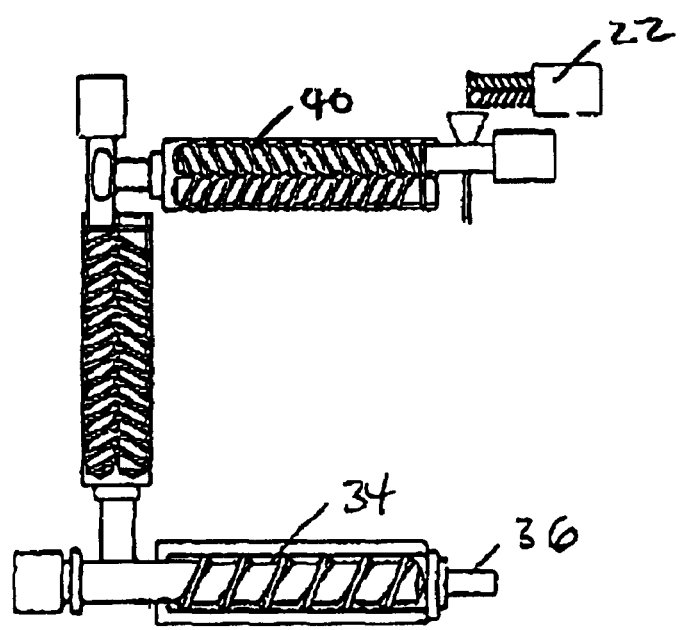
FIG. 4d is a schematic diagram of an extrusion process similar to that shown in FIG. 4a but showing a twin screw extruder instead of a single screw extruder as the second extruder and a cooling extruder.

For high wood-fiber content a cooling extruder 34, as shown in FIG. 4b, can be used as a cooling device instead of a heat exchanger with static mixer. The extrudate finally passes through the die where its pressure is rapidly dropped, which produces a large number of nucleation sites due to the Spinodal decomposition of polymer and gas. The gas from the adjacent polymer matrix diffuses into these sites and causes expansion. The temperature of the die can be controlled so as to freeze the surface layer of the polymer, which prevents the diffusion of gases into the atmosphere.

EXAMPLE FOR PROCESS D

Material

HDPE Grade 58G from Novacor was used as the base polymers for the composites. The wood-fibers were standard softwood (pine) grade 12020, supplied by American Wood Fibers. The CBA, Hydrocerol Compound (HC), was supplied by Boehringer Ingelheim. The coupling agent used for improving the adhesion between the PE and the wood-fiber was Fusabond adhesive resin E-MB-100D from Dupont, Canada. All the materials were used as received.

Experimental Setup and Procedure

The cascade or tandem extrusion system shown in FIG. 4a was used in the experiments. The mixtures were dry blended and fed into the first twin-screw extruder 40, using a feeder 22. The temperature in this extruder was maintained at a level sufficient for vaporizing the moisture (145° C. to 170° C.), but not so high as to cause the decomposition of CBA and the degradation of wood-fiber. The output of this extruder was fed into the second extruder 42. At the interconnection, which was open to atmosphere, substantially all the vaporized water and other volatiles were devolatilized and the moisture and volatile-free mixture was conveyed into the second extruder 42 by the motion of the screw. The temperatures in the second tandem extruder 42 were maintained at 155° C. and 165° C. in zones 1 (43) and 2 (45), respectively. The CBA was decomposed in zone 3 (47) and the released gases were dissolved in the polymer matrix under the action of high shear at elevated temperature and pressure. The temperature of the melt was then lowered (typically to 150° C.) in a heat exchanger 22. Finally, it was extruded out through the die 36 where the surface temperature was further reduced (to about 150° C. Lower limit is determined by material and its MFI. In some cases it can go even below 140° C.) to increase the stabilization of the foaming process. Samples were taken at various die temperatures for density measurement and cell morphology characterization.

Results and Discussion

Using this system, composite foams could be produced with controllable foam density varying from 0.5 g/cm$^3$ to 0.8 g/cm³. These composites also exhibited uniform cell distribution and superior surface quality as compared to those produced on a non-devolatilized system. The generation of large sized cells was successfully suppressed, and the cell population density was increased by one order of magnitude. Therefore, the uniformity of cell structure was significantly improved by adopting the process described herein.

The use of CBA requires some special material and processing considerations. The processing temperature in the first extruder and the vent should be lower than the decomposition temperature of the blowing agent. The onset of decomposition for HC, the blowing agent used, is 160° C., so the previously mentioned temperatures should not exceed this limit. This would suggest that the polyethylene materials could be effectively foamed with a HC on this system.

Process E

For process E, the present invention uses the volatile emissions from the wood-fibers for generating a fine-celled foamed structure without utilizing any other blowing agent. The wood-fiber will release moisture or volatiles at high temperatures as mentioned earlier. These volatiles, in general, will affect foaming negatively, especially at a larger content. But with certain materials and under certain processing conditions, as long as the amount of volatiles is not high, these volatiles can be utilized to generate an acceptable cell structure in plastic/wood-fiber composite foams having good surface properties as well. Usually, the higher the temperature, the greater the amount of moisture/volatiles released. In order to suppress the adverse effects of the excessive moisture/volatiles on the cell structure, we can lower the processing temperature is lowered to a reasonable degree and the foaming process is controlled while utilizing these emissions.

Process Description: Process E utilizes same equipment as process C in which no other blowing agent is used. The material is pre-dried by any of the conventional methods, such as oven drying, K-mixer blending or hot air-drying so that most of the moisture and other volatiles are removed either from the wood-fibers or from the plastic/wood-fiber/additives mixture. If dried wood-fibers are used, they are mixed with plastic and coupling agent and dry blended. If a K-mixer is used, the mixture is granulated in a granulator. The blended mixture is then fed into the extruder 20 through a feeder 22 if dried wood-fibers are used or directly into the hopper if K-mixer was used. The equipment used is same as in FIG. 3a and the processing steps are also same as in process C, except the heating temperature is not determined by the decomposition temperature of chemical blowing agent.

Care should be taken that the barrel temperature should not be too high to generate excessive volatiles (below 170° C.). The temperature of the molten mixture is controlled so that a limited amount of moisture or volatiles can be released from the wood-fiber, which is used for foaming. Consider a specific case of cascade extrusion processing at 170° C., in which the residence time in the first extruder is 3 minutes and the processing time in the second extruder is 2 minutes. In addition to loosing all the moisture, the wood fibers will loose an additional 0.65% weight in the first extruder. These wood fibers will loose a further 0.2% weight while being processed in the second extruder, part of which will be entrapped and contribute to foaming. The amount of volatile emissions which contribute to foaming can be controlled by varying the processing temperature and the residence time in the extruder. This mixture is then subjected to high shear forces by the screw and/or by any type of mixers, in the presence of high pressures and temperatures. Temperatures and pressures are measured and the temp. can be controlled by band heaters and the pressure by controlling the flow rate. This facilitates the dissolution or dispersion of the gases emitted by the wood-fiber, into the polymer matrix. The melt temperature of the polymer/gas mixture is reduced (typically to 150° C.) in a heat exchanger. A commonly well-known static mixer in a cooling heat exchanger shown in FIG. 3a can be used.

For high wood-fiber content a cooling extruder 34, as shown in FIG. 3b, can be used as a cooling device instead of a heat exchanger with static mixer. The extrudate finally passes through the die where its pressure is rapidly dropped, (more than 1000 psi across the die) which produces a large number of nucleation sites due to the Spinodal decomposition of polymer and volatiles. The volatiles from the adjacent polymer matrix diffuses into these sites and causes expansion. The temperature of the die can be controlled so as to freeze the surface layer of the polymer and/or to decrease the diffusivity of volatiles, which prevents the diffusion of gases into the atmosphere.

Process F

For process F, the present invention envisages the use of the volatile emissions from the wood-fibers for generating a fine-celled foamed structure without utilizing any other blowing agent. The concept of using these emissions from the wood-fiber is same as described for process E, the only difference being that the excessive moisture and volatiles are removed through a vent in a tandem system.

Process Description: Process F utilizes same equipment as of process D while no other blowing agent is used. Online devolatilization is used for purging out most of the moisture and other volatiles from the plastic/wood-fiber/additives mixture. In the preparatory stage, the un-dried wood-fiber is mixed with the polymer powder/pellets and a coupling agent, in a dry blending tumbler. The blended mixture is then fed into the first extruder 20 through a feeder 22. The equipment used is same as in FIG. 4a and the processing steps are also same as in process D.

The first extruder 40 can be a single or twin-screw mixing extruder or compounder, where plastication and mixing takes place. During this process, most of the moisture and other volatiles are evaporated through the hopper due to the elevated temperature. The molten mixture is then devolatilized at a vent in a cascade extrusion system and conveyed into the second extruder 42. Care should be taken that the temperature at the vent should not be high enough to degrade the wood-fibers. On-line devolatilization can be accomplished within the first extruder if a twin screw extruder is used as the first extruder, and devolatilizing ports can be opened alone the screws.

In the second extruder 42, the temperature of the molten mixture is controlled so that a limited amount of moisture or volatiles can be released from the wood-fiber, which is used for foaming. This mixture is then subjected to high shear forces by the screw and/or by any type of mixers, in the presence of high pressures and temperatures. This facilitates the dissolution or dispersion of the gases emitted by the wood-fiber, into the polymer matrix. The melt temperature of the polymer/gas mixture is reduced in a heat exchanger. A commonly well-known static mixer in a cooling heat exchanger shown in FIG. 4a can be used.

For high wood-fiber content, a cooling extruder 34, as shown in FIG. 4b, can be used as a cooling device instead of a heat exchanger with static mixer. The extrudate finally passes through the die where its pressure is rapidly dropped, which produces a large number of nucleation sites due to the Spinodal decomposition of polymer and volatiles. The volatiles from the adjacent polymer matrix diffuse into these sites and causes expansion. The temperature of the die can be controlled so as to freeze the surface layer of the polymer and/or to decrease the diffusivity of volatiles, which prevents the diffusion of gases into the atmosphere.

EXAMPLES FOR PROCESS E

Material

HDPE Grade 2710 from Novacor was used as the base polymers for the composites. The wood-fibers were standard softwood (pine) grade 12020, supplied by American Wood Fibers. The coupling agent used for improving the adhesion between the PE and the wood-fiber was Fusabond adhesive resin E-MB-100D from Dupont, Canada. All the materials were used as received.

Experimental Setup and Procedure

The tandem extrusion system shown in FIG. 4a was used in the experiments. The mixtures were dry blended and fed into the first twin-screw extruder 40, using a feeder 22. The temperature in this extruder was maintained at a level sufficient for adequate processing of material, but not so high as to cause the degradation of wood-fiber (from 145° C. to 170° C.). The output of this extruder was fed into the second extruder, At the interconnection, which was open to atmosphere, all the vaporized water and other volatiles were devolatilized and the moisture and volatile free mixture was conveyed into the second extruder by the motion of the screw. The temperatures (from 145° C. to 160° C.) in the second tandem extruder were maintained at low levels in zones 1 and 2. Additional gases were evolved from wood-fiber by elevating the mixture temperature in zone 3 and the released gases were dissolved in the polymer matrix under the action of high shear at elevated temperature and pressure. Typically the pressure was between 2000–3000 psi. A range of temperatures were tested and it was determined that temperatures between 150° C. and 185° C. worked. However, the barrel temperature should be typically below 170° C. The temperature of the melt was then lowered in a heat exchanger 22 (to about 150° C.). Finally, it was extruded out through the die 36 where the surface temperature was further reduced to increase the stabilization of the foaming process.

Two sets of procedures were adopted to produce HDPE/wood-fiber composite foams. In the first set of experiments, the devolatilizing vent temperature was set at three different values, and the highest barrel temperature was varied at 5° C. intervals for each vent temperature. In the second set of experiments, the devolatilizing vent temperature was kept constant, but the highest barrel temperature was set at three different values, and the die temperature was varied at 5° C. intervals for each barrel temperature.

Results and Discussion

Experiments with Varying Barrel Temperature

A set of experiments of HDPE mixed with undried wood-fiber and 3% coupling agent, without a blowing agent were carried out to identify the relationship between processing temperatures and the cell structure, while fixing the drying (i.e., devolatilizing) conditions. This was done to find the lowest processing temperature at which the moisture/volatiles generation from wood-fiber is minimized and the small amount generated could be utilized for foaming.

In this set of experiments, three different devolatilizing temperatures at the vent were used and for each of these, the barrel temperature in the second extruder was varied to identify its effect on the cell structure. The die temperature was maintained to be 140° C.

Figure 5:
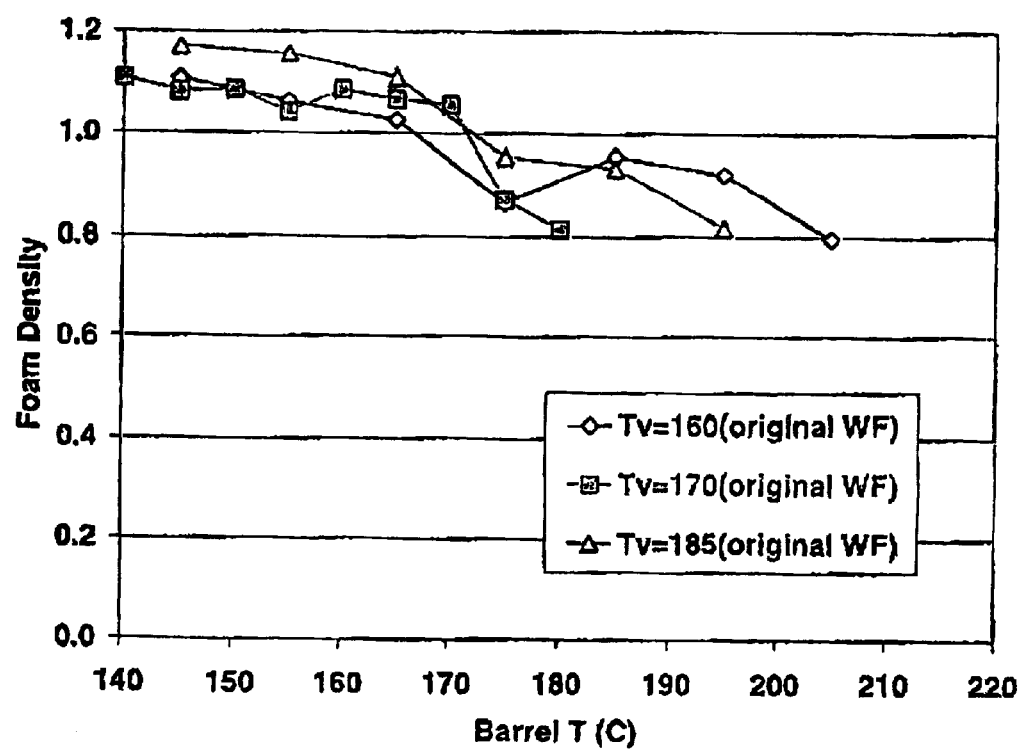
FIG. 5 is a temperature/foam density graph comparing changes in density of wood fibre composite foam structures with changing barrel temperature at three different devolatization vent temperatures.
Figure 6:
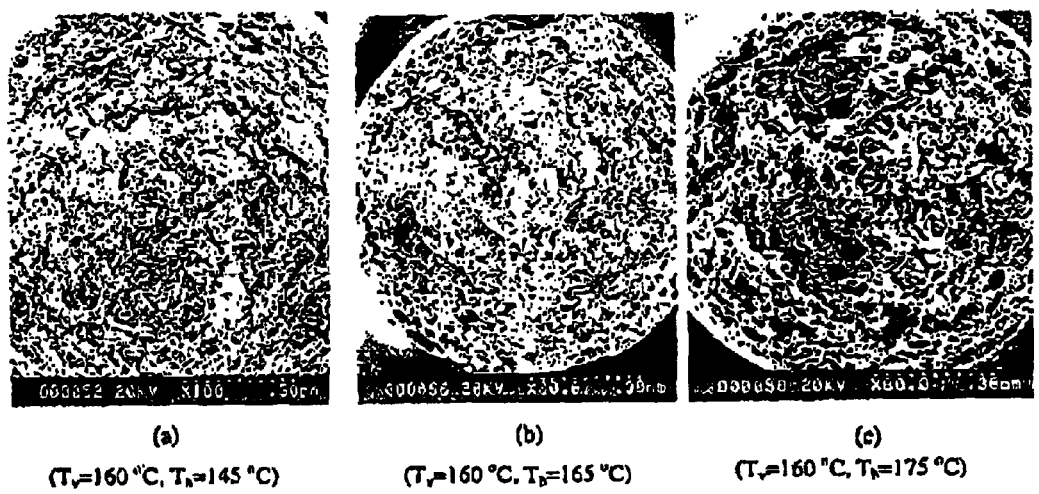
FIG. 6 are scanning electron micrographs of wood fibre composite foam structures at different barrel temperatures.

FIG. 5 shows that the foam density of wood-fiber composites was decreased as the barrel temperature in the second extruder increased. At a higher barrel temperature, the wood-fiber released more moisture/volatiles out, and therefore, the foaming effects of these volatiles were increased and the foam density was reduced. For the barrel temperature range of 145° C.–170° C., the foam density was around 1.1 g/cm$^3$. Above 170° C., the foam density decreases quickly to 0.85 g/cm$^3$. This implies that a lot of moisture/volatiles were released from wood-fiber above 170° C. and resulted in significant foaming. FIG. 6 shows some typical cell morphologies of the wood-fiber/HDPE composite foam samples blown without any blowing agents. At the same devolatilizing temperature of 160° C., when the barrel temperature increased from 145° C., 165° C., to 175° C., it is observed that foaming occurred due to the volatiles/moisture generated from the wood-fiber, and the corresponding foam density was 1.1 g/cm$^3$, 1.0 g/cm$^3$, and 0.87 g/cm$^3$, respectively. At the barrel temperature 145° C., there was almost no foaming in the composite. As the barrel temperature was increased to 165° C., some small sized bubbles and voids appeared. When the barrel temperature was further increased to 175° C., it is obvious that more volatiles were released from wood-fiber resulting in significant foaming with an irregular cellular structure. This implies that when the amount of generated moisture and volatiles is significant, due to the high processing temperature, the formation of big voids is difficult to avoid. Therefore, to minimize the effects of moisture/volatiles on foaming, the maximum processing temperature in the second extruder should be low, preferably below 170° C.

FIG. 5 also shows that the foam density of composites generally increased as the devolatilizing temperature $T_v$ was increased. This implies the devolatilizing vent is effective in removing moisture/volatiles from wood-fiber. Another interesting observation from this figure is that the foam density decreased slightly as the second barrel temperature $T_b$ increased while $T_b<T_v$. When $T_b>T_v$, the foam density decreased sharply when the barrel temperature was increased. This shows wood-fiber will further release moisture/volatiles even after the devolatilization at the vent, because of the higher processing temperature than the drying (i.e., devolatilization) temperature. Therefore, it is essential to set the barrel temperature lower than the devolatilizing temperature, to minimize the gaseous emissions additionally generated during processing, and thereby, to produce a fine celled structure. This inference is also equally applicable to the pre-drying case of process A and process C.

Experiments with Varying Die Temperature

Another set of experiments of HDPE mixed with un-dried wood-fiber and 3% coupling agent, without a blowing agent were carried out to identify the relationship between die temperatures and the foam density at three different barrel temperature, while fixing the drying (i.e., devolatilizing) condition at 170° C. This was done to find the lowest density achievable when the moisture/volatiles generation from wood-fiber is utilized for foaming, while the amount of moisture and volatile is minimal to produce a fine-celled structure, by maintaining the second extruder barrel temperature below 170° C. Experiment was also conducted at high second extruder barrel temperature above 170° C. for comparison puspose.

Figure 7:
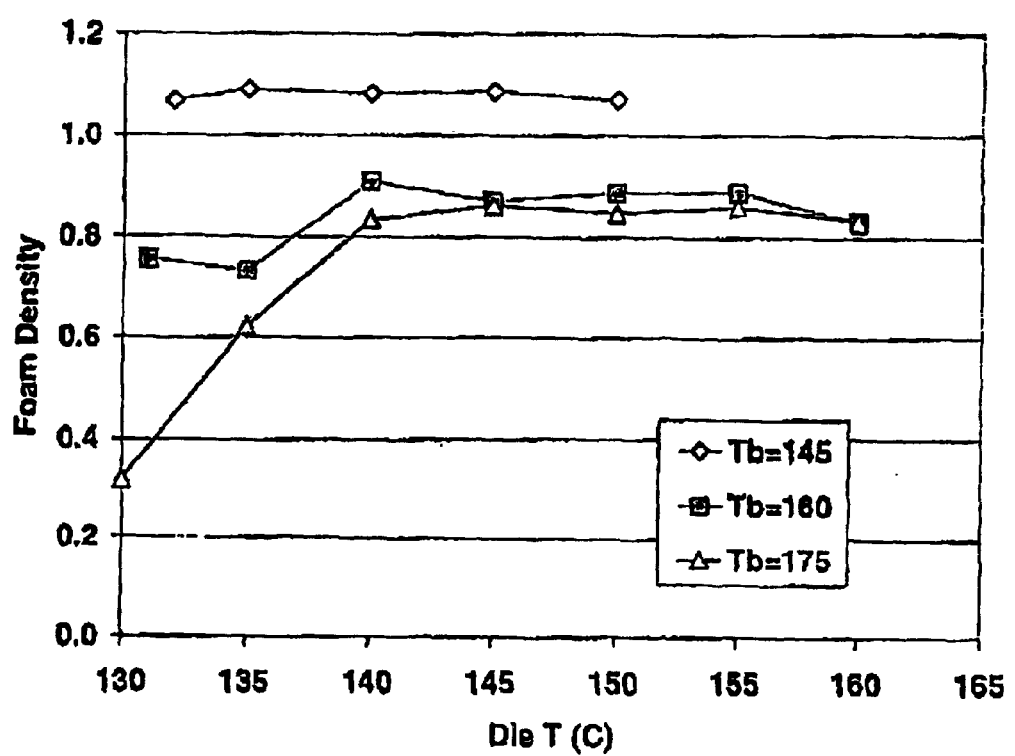
FIG. 7 is a temperature/foam density graph comparing changes in density of wood fibre composite foam structures with changing die temperature at three different barrel temperatures for a fixed vent temperature.

FIG. 7 shows that the foam density of wood-fiber composites was decreased significantly as the die temperature decreased, when the barrel temperature was 175° C. However, because of too high a barrel temperature, the wood-fiber released too much moisture/volatiles, and as a result, irregular-shaped, big-sized cells were observed and the foam structure was very non-uniform. For the barrel temperature of 160° C., the foam density could be lowered below 0.75 g/cm$^3$, by decreasing the die temperature below 140° C. The foam structure was very fine because of the small amount of volatiles generated at this low barrel temperature. For a barrel temperature of 145° C., no foaming could be obtained. In fact the final density was always more than the density of the individual components indicating that the high extrusion pressures compacted the composite. This also indicates that lower processing temperature suppresses the volatile emission from the wood-fiber which has been dried (i.e., devolatilized) at a higher temperature.

REFERENCES

1. Balatinecz, J. J., and Woodhams, R. T., "Wood-Plastic Composites: Doing more with less," *J. Forestry.* 91, 22 (1993).
2. Chtourou, H., Riedl, B., and Ait-Kadi, A., "Reinforcement of Recycled Polyolefins with Wood-Fibers," *J. of Reinforced Plastics and Composites.* 11, 372 (1992).
3. Raj, R. G., Kokta, B. V., Groleau, G. & Daneault, C., "Use of wood fiber as a filler in polyethylene: studies on mechanical properties", *Plastics and Rubber Processing and Applications,* 11, 215 (1989).
4. Youngquist, J. A., and Rowell, R. M., In Proceedings, 23rd International Particleboard/Composite Materials Symposium. T. M. Maloney, ed., Was. State Univ., Pullman, p. 141 (1990).
5. Matuana, L. M., Balatinecz, J. J., and Park, C. B., Polym. Eng. Sc., 38, 765 (1998).
6. Rauwendaal, C., *Polymer Extrusion,* 3rd ed., Hanser Publishers (1994).
7. Brooke, J. G., Goforth, B. D., Goforth, C. L., U.S. Pat. No. 5,082,605, 1992.
8. Goforth, B. D., Goforth, C. L., Brooke, J. G., U.S. Pat. No. 5,096,046, 1992.
9. Goettler, L. A., U.S. Pat. No. 4,376,144, 1983.
10. Turk, D. L., Grill, O., U.S. Pat. No. 5,858,522, 1999.
11. Deaner, M. J., Puppin, G., Heikkila., U.S. Pat. No. 5,827,607, 1998.
12. Deaner, M. J., Puppin, G., Heikkila., U.S. Pat. No. 5,539,027, 1996.
13. Deaner, M. J., Puppin, G., Heikkila., U.S. Pat. No. 5,486,553, 1996.
14. Deaner, M. J., Puppin, G., Heikkila., U.S. Pat. No. 5,932,334, 1999.
15. Pelikan, H. D., Titz, S., U.S. Pat. No. 4,104,207, 1978.
16. Boutillier, P. E., U.S. Pat. No. 3,764,642, 1973.
17. Cope, C. W., U.S. Pat. No. 5,508,103, 1996.
18. Cope, C. W., U.S. Pat. No. 5,847,016, 1998.
19. Bejan, A., "Advanced Engineering Thermodynamics", John Wiley & Sons, N.Y. 1997.
20. M. Lee, C. Tzoganakis, and C. B. Park, "Extrusion of Polymer Blend with Supercritical $CO_2$", *Advances in Polymer Technology,* August 1999.
21. A. A. Marra, *Technology of Wood Bonding: Principles in Practice,* Van Nostrand Reihold, N.Y. (1992).
22. G. Rizvi, C. B. Park, and L. M. Matuana, "Foaming of PS/Wood-Fiber Composites Using Moisture as a Blowing Agent", *Polymer Engineering and Science,* October 2000.
23. Ugine Kuhlmann, P. Botillier, Fr. Pat. 1498620 in 1967 (to Ugine Kuhlmann)
24. Ugine Kuhlmann, Br. Pat. 1184688 in 1967 (to Ugine Kuhlmann)

What is claimed is:

1. A process for producing plastic/wood fiber composite foamed structures comprising the steps of:

pre-drying wood fiber filler having a degradation temperature and an active volatization temperature and maintaining the pre-drying temperature below the degradation temperature to produce dried wood fiber filler;

mixing the dried wood fiber filler with plastic to produce a plastic/wood fiber mixture and maintaining the mixing temperature below the active volatilizing temperature;

feeding the plastic/wood fiber mixture into an extruder and maintaining the temperature of the plastic/wood fiber mixture below the active volatilizing temperature;

introducing a blowing agent into the plastic/wood fiber mixture and mixing it therewith to produce a plastic/wood fiber/gas mixture and maintaining the temperature of the plastic/wood fiber/gas mixture below the active volatilizing temperature;

subjecting the plastic/wood fiber/gas mixture to high shear forces in the presence of high pressures and maintaining a processing temperature below the active volatilizing temperature; and extruding the plastic/wood fiber/gas mixture to produce a plastic/wood fiber composite foamed structure and maintaining the temperature of the plastic/wood fiber/gas mixture below the active volatilizing temperature.

2. A process as claimed in claim 1 wherein the pre-drying temperature is between the active volatilization temperature and the degradation temperature.

3. A process as claimed in claim 1 wherein the pre-drying temperature is below 180° C.

4. A process as claimed in claim 3 wherein the mixing temperature is below 170° C.

5. A process as claimed in claim 4 wherein the processing temperature is below 170° C.

6. A process as claimed in claim 1 wherein the mixing temperature is below 170° C.

7. A process as claimed in claim 1 wherein the processing temperature is below 170° C.

8. A process as claimed in claim 1 wherein the blowing agent is a physical blowing agent.

9. A process as claimed in claim 8 wherein the physical blowing agent is chosen from the group consisting of any of the non-reactive gases such as $CO_2$, $N_2$, He, Ar, Air, or a mixture of thereof.

10. A process as claimed in claim 1 wherein the blowing agent is a chemical blowing agent.

11. A process as claimed in claim 5 wherein the blowing agent is a physical blowing agent.

12. A process as claimed in claim 11 wherein the physical blowing agent is chosen from the group consisting of any of the non-reactive gases such as $CO_2$, $N_2$, He, Ar, Air, or a mixture of thereof.

13. A process as claimed in claim 5 wherein the blowing agent is a chemical blowing agent.

14. A process as claimed in claim 1 further including the step of reducing the temperature of the plastic/wood fiber/gas mixture prior to the step of extruding thereby stabilizing the cell structure in the plastic/wood fiber/gas mixture.

15. A process as claimed in claim 14 wherein the temperature is reduced in one of a cooling extruder and a heat exchanger.

16. A process as claimed in claim 5 further including the step of reducing the temperature of the plastic/wood fiber/gas mixture prior to the step of extruding thereby stabilizing the cell structure in the plastic/wood fiber/gas mixture.

17. A process as claimed in claim 16 wherein the temperature is reduced in one of a cooling extruder and a heat exchanger.

18. A process as claimed in claim 1 further including the step of reducing the temperature of the plastic/wood fiber/ gas mixture prior to the step of extruding thereby stabilizing the cell structure in the plastic/wood fiber/gas mixture.

19. A process as claimed in claim 18 wherein the temperature is reduced in one of a cooling extruder and a heat exchanger.

20. A process as claimed in claim 8 further including the step of reducing the temperature of the plastic/wood fiber/gas mixture prior to the step of extruding thereby stabilizing the cell structure in the plastic/wood fiber/gas mixture.

21. A process as claimed in claim 20 wherein the temperature is reduced in one of a cooling extruder and a heat exchanger.

22. A process as claimed in claim 10 further including the step of reducing the temperature of the plastic/wood fiber/gas mixture prior to the step of extruding thereby stabilizing the cell structure in the plastic/wood fiber/gas mixture.

23. A process as claimed in claim 22 wherein the temperature is reduced in one of a cooling extruder and a heat exchanger.

24. A process as claimed in claim 1 wherein the extruder is one of a twin screw extruder and a single screw extruder.

25. A process as claimed in claim 5 wherein the extruder is one of a twin screw extruder and a single screw extruder.

26. A process as claimed in claim 8 wherein the extruder is one of a twin screw extruder and a single screw extruder.

27. A process as claimed in claim 10 wherein the extruder is one of a twin screw extruder and a single screw extruder.

28. A process as claimed in claim 14 wherein the extruder is one of a twin screw extruder and a single screw extruder.

29. A process as claimed in claim 16 wherein the extruder is one of a twin screw extruder and a single screw extruder.

30. A process as claimed in claim 18 wherein the extruder is one of a twin screw extruder and a single screw extruder.

31. A process as claimed in claim 20 wherein the extruder is one of a twin screw extruder and a single screw extruder.

32. A process as claimed in claim 22 wherein the extruder is one of a twin screw extruder and a single screw extruder.

33. A process for producing plastic/wood fiber composite foamed structures comprising the steps of:
pre-drying wood fiber filler to produce dried wood fiber filler;
mixing the dried wood fiber filler with plastic to produce a plastic/wood fiber mixture and maintaining the mixing temperature below the active volatilizing temperature;
feeding the plastic/wood fiber mixture into an extruder and maintaining the temperature of the plastic/wood fiber mixture below the active volatilizing temperature;
mixing a physical blowing agent into the plastic/wood fiber mixture to produce a plastic/wood fiber/gas mixture and maintaining the temperature of plastic/wood fiber/gas mixture below the active volatilizing temperature;
subjecting the plastic/wood fiber/gas mixture to high shear forces in the presence of high pressures and maintaining a processing temperature below the active volatilizing temperature; and
extruding the plastic/wood fiber/gas mixture to produce a plastic/wood fiber composite foamed structure and maintaining the temperature of the plastic/wood fiber/gas mixture below the active volatilizing temperature.

34. A process as claimed in claim 33 further including the step of reducing the temperature of the plastic/wood fiber/gas mixture prior to the step of extruding thereby stabilizing the cell structure in the plastic/wood fiber/gas mixture.

35. A process as claimed in claim 34 wherein the physical blowing agent is selected from the group consisting of $CO_2$ and $N_2$.

* * * * *